US005455497A

United States Patent [19]
Hirose et al.

[11] Patent Number: 5,455,497
[45] Date of Patent: Oct. 3, 1995

[54] LEGGED MOBILE ROBOT AND A SYSTEM FOR CONTROLLING THE SAME

[75] Inventors: Masato Hirose; Hiroshi Gomi; Hideaki Takahashi; Toru Takenaka; Masao Nishikawa; Tadanobu Takahashi, all of Saitama, Japan

[73] Assignee: Honda Giken Kogyo Kabushiki Kaisha, Tokyo, Japan

[21] Appl. No.: 49,494

[22] Filed: Apr. 19, 1993

[30] Foreign Application Priority Data

Apr. 28, 1992 [JP] Japan .................................... 4-126765
Apr. 28, 1992 [JP] Japan .................................... 4-136256
Apr. 30, 1992 [JP] Japan .................................... 4-137881

[51] Int. Cl.$^6$ ............................ B25J 11/00; G05B 19/00
[52] U.S. Cl. .................................. 318/568.12; 318/568.1; 318/568.22; 901/1; 180/8.1; 180/8.6; 395/95
[58] Field of Search .................................. 318/560–646; 901/1, 3, 5, 7, 9, 12, 13, 15, 33, 40–49; 395/80–99; 180/8.1–8.9; 414/730–735

[56] References Cited

U.S. PATENT DOCUMENTS

| | | | |
|---|---|---|---|
| 4,641,251 | 2/1987 | Inoue | 901/1 X |
| 4,776,852 | 10/1988 | Rubic | 623/26 |
| 4,834,200 | 5/1989 | Kajita | 180/8.1 |
| 5,151,859 | 9/1992 | Yoshino et al. | 180/8.6 |
| 5,159,988 | 11/1992 | Gomi et al. | 180/8.6 |
| 5,206,569 | 4/1993 | Ozawa | 318/568.12 |
| 5,221,883 | 6/1993 | Takenaka et al. | 318/568.12 |
| 5,236,385 | 8/1993 | May | 446/300 |
| 5,252,901 | 10/1993 | Ozawa et al. | 318/568.12 |
| 5,255,753 | 10/1993 | Nishikawa et al. | 180/8.6 |

FOREIGN PATENT DOCUMENTS

| | | |
|---|---|---|
| 62-97006 | 5/1987 | Japan . |
| 63-150176 | 6/1988 | Japan . |
| 3184782 | 8/1991 | Japan . |
| 3184781 | 8/1991 | Japan . |

OTHER PUBLICATIONS

English language Abstract of JP 3–184781, 3–184782, & 62–97006.
Article entitled "Experiments in Balnce with a 2D One–Legged Hopping Machine", M. Raibert & H. Brown, Jr.; Journal of Dynamic Systems, Measurement and Control; Mar. 1984, vol. 106/75.
Article published in Journal of the Robotic Society of Japan, vol. 9, No. 5, pp. 167–203.
Article published in Journal of the Robotic Society of Japan (1991); vol. 9, No. 5, pp. 638–643.
Article entitled "Robots do the dirty work" (Mark A. Fischetti).
Publication in Machines that Work entitled "The Adaptive Suspension Vehicle", Chapter 9.
Article entitled "Dynamic Walking of Stilt–Type Biped Walking Robot".
Article entitled "Legged Robots on Rough Terrain; Experiments in Adjusting Step Length", in IEEE (1988), by Jessica Hodgins.

*Primary Examiner*—Paul Ip
*Attorney, Agent, or Firm*—Lyon & Lyon

[57] ABSTRACT

A legged mobile robot having a body and two legs each connected to the body. The robot is quipped with a mechanism for absorbing and moderating impacts produced by external forces during footfall or the like. The mechanism includes an elastic member interposed between the body and legs, or interposed between the leg links, or interposed between the distal end of the legs and foot portions. The robot further has a foot structure for enhancing the ground gripping force and absorbs the impacts. For enhancing the gripping force, the foot sole is provided, for example, with a first elastic member and second elastic member sandwiching a plate spring therebetween. The first elastic member absorbs the impacts, while the second elastic member enhancing the gripping force. The plate spring restrict the deformation of the elastic members in the direction vertical to the foot sole. The invention further includes a locomotion control system using one shock absorbing mechanism.

42 Claims, 37 Drawing Sheets

LEGGED MOBILE ROBOT AND A SYSTEM FOR CONTROLLING THE SAME

BACKGROUND OF THE INVENTION

1. Field of the Invention

This invention relates to a legged mobile robot, more particularly to a legged mobile robot equipped with a mechanism for absorbing and moderating impacts produced by external forces during footfall or the like, or a foot structure for enhancing the ground gripping force, or a locomotion control system of the robot equipped with the structure.

2. Description of the Prior Art

Wheeled, crawler, legged or other types of mobile robots have been proposed. Among the numerous reports published regarding control technologies for the legged robot are (Raibert, M. H., Brown, Jr. H. B., "Experiments in Balance with a 2D One-Legged Hopping Machine", ASME, J of DSMC, vol. 106, pp. 75–81 (1984)), the two-legged robot (J of the Robotic Society of Japan, vol.1, no. 3, pp. 167–203 (1983)), the four-legged robot (J of the Robotic society of Japan, vol. 9, no.5, pp. 638–648 (1991)), and the six-legged robot (Fischeti, M. A., "Robots Do the Dirty Work", IEEE, Spectrum, vol. 22, no.4, pp. 65–72 (1985) and Shin-Min Song, Kenneth J. Waldron, "Machines That Walk; The Adaptive Suspension Vehicle", The MIT Press Cambridge, Mass., London, England). Other reports have been published regarding techniques for real time generation of a dynamically stable motion (walking) pattern for a robot which relatively few degrees of freedom (Shimoyama, "Dynamic Walking of Stilt-type Biped Walking Robot", Collected Papers of The Japan Society of Mechanical Engineers, book C, vol.48, no. 1445–1454 (1982) and "Legged Robots on Rough Terrain; Experiments in Adjusting Step Length", by Jessica Hodgins, IEEE (1988)), and also on techniques for offline generation of a stable motion (walking) pattern for a robot with relatively many degrees of freedom (Japanese Laid-Open Patent Publication nos. 62(1987)-97006 and 63(1988)-150176). Also the assignee proposed the anthropoid biped robot in Japanese Laid-open Patent Publication No. 3(1991)-184,782.

Among robots, the biped type constantly receives a force of reaction from the ground on the foot or feet in contact with the ground. In particular, at the time the free leg touches down during walking, the reactive force may become an impact of such magnitude that it disturbs the robot's attitude and causes it to become unstable. The legged mobile robot proposed earlier by the assignee comprises links interconnected by joints which are driven by motors through reduction gear mechanism made up of Harmonic drives (trade name) so as to vary the relative positions among the links. The impacts produced at footfall act as loads on the reduction gear mechanisms, bearings and other parts of the joint drive mechanism. In addition, since the legged mobile robot walks by alternately swinging first one and then the other of its two legs forward, the swinging force (inertial force) produced at the time the free leg is thrown forward acts as a load on the free leg joints, particularly on the knee joints. Such loads produced by external forces have an adverse effect on the service life of the joint drive mechanisms and are also a cause of robot's attitude instability. These footfall impact forces and inertial forces may further have an adverse effect on the robot's onboard control unit, which uses a microcomputer and other precision electronic components, as well as on any payload the robot may be carrying.

SUMMARY OF THE INVENTION

One object of this invention is therefore to provide a legged mobile robot equipped with an impact absorption mechanism which absorbs and moderates the impacts that act on the robot at the time of the occurrence of forces of reaction from the ground and of inertial forces, thus reducing their effect on the robot.

Although impact absorption can also be achieved by reducing the rigidity of the robot's links, this expedient causes another problem: it makes it difficult to determine the position of the robot with respect to coordinate axes.

Therefore, another object of the invention is to provide a legged mobile robot equipped with an impact absorption mechanism which enables absorption and moderation of external forces while minimizing the effect thereof on the determination of the robot's position relative to coordinate axes.

Moreover, in the mobile robot, particularly in a biped mobile robot, swinging of the free leg produces a torque (rotational moment) around the vertical axis of the supporting leg. To prevent the sole of the supporting foot from slipping on the ground surface during one-leg support periods it is necessary to produce a frictional torque at the sole which is large enough to resist this moment. This will be considered in quantitative terms with reference to FIG. 41.

FIG. 41 shows a biped walking mobile robot advancing along the x axis (advance direction) as viewed in the y direction (direction perpendicular to the advance direction). FIG. 42 shows the same robot as viewed in the x direction. Let the mass of each of the robot's feet be 10 kg, the step length h be 0.2 m, and the foot swing pattern be such that the foot accelerates from time zero (footrise) to a speed of 3 m/s in 0.2 sec., maintains this speed for 0.2 sec. and then decelerates to a speed of zero 0.6 sec. later (footfall). Under these conditions the foot swing acceleration $\alpha$ becomes $$\alpha = 3 \text{ [m/sec.]}/0.2 \text{ [sec.]}$$
$$= 15 \text{ [m/sec.}^2\text{]}$$

The spin force F is therefore $$F = mf \cdot \alpha \cdot h$$
$$= 10 \text{ [kg]} \times 15 \text{ [m/sec.}^2\text{]} \times 0.2 \text{ [m]}$$
$$= 30 \text{ [N} \cdot \text{m]}$$

Thus in a biped walking mobile robot a large spin force acts around the vertical axis (z axis).

Therefore, the third object of the invention is to provide a legged mobile robot having a foot structure which ensures strong resistance to the spin force (rotational moment) around the vertical axis and enables the robot to maintain a stable attitude at footfall.

On the other hand, with ground contact pressure further from the vertical rotation axis, it is preferable to place the ground contact pressure distribution to, for example, the four corners of the sole. Assume, for instance, that, as shown in FIG. 43, the ground contact load is received at four ground contact surfaces provided at the four corners and that the center of rotation is at the center of the sole. Under these conditions, the critical frictional torque Tmax becomes Tmax=ground constant load×coefficient of friction×distance l If the ground contact load is 1000N, the coefficient of friction is 0.3, and distance 1 is 0.12 [m], then $$T\max = 1000 \times 0.3 \times 0.12$$
$$= 36 \ [N \cdot m]$$

The value of the spin force and the critical frictional torque thus become fairly close.

The fourth object of the invention is therefore to provide a legged mobile robot having a foot structure which provides high resistance to spin force by maximizing the critical frictional torque.

Further, the terrain over which a legged mobile robot walks invariably includes some degree of roughness. When footfall occurs on a rough portion of the terrain, the robot's attitude is disturbed and stable walking cannot be ensured.

The fifth object of the invention is therefore to provide a legged mobile robot having a foot structure which enables the soles of the robot's feet to adapt to irregularities in the terrain as much as possible at the time of footfall.

Furthermore, the impact experienced by a legged mobile robot at the time of footfall acts as disturbance tending to destabilize the robot's attitude.

The sixth object of the invention is therefore to provide a legged mobile robot having a foot structure which stabilizes the robot's attitude by maximizing impact absorption at the time of footfall.

Still furthermore, when a legged mobile robot, particularly a biped walking mobile robot, is stationary or walking slowly it is preferable for the soles of the feet to be large so as to position the robot's center of gravity at the sole and thus stabilize its attitude. During fast walking, on the other hand, it is preferable to make the soles of the feet small so as to reduce the ground contact area.

The seventh object of the invention is therefore to provide a legged mobile robot having a foot structure in which the sole configuration is appropriate for fast walking.

Yet still furthermore, when the ground contact area of the soles of a walking robot's feet is reduced, the robot becomes unstable when at rest.

The eighth object of the invention is therefore to provide a legged mobile robot having a foot structure in which the sole configuration is appropriate for fast walking and stationary stability is augmented.

Apart from the above, where the robot's motion pattern is generated offline, however, the terrain over which a legged mobile robot moves seldom conforms strictly to that presumed by the design but instead frequently includes irregularities (bumps and depressions) and inclines not contemplated by the walking pattern. When the mobile walking robot encounters such an irregularity or incline, it is apt to experience unexpected disturbances which destabilize its attitude. The foregoing is also true as regards the methods for generating motion patterns in real time. Moreover, the robot's legs receive forces of reaction from the ground at the time of footfall. A large reactive force also degrades the attitude stability. An attempt to eliminate these problems by making the legs more compliant or flexible create a bigger problem than it solves: it decreases the thrust of the feet against the ground to an unacceptable level.

The ninth object of the invention is therefore to provide a locomotion control system for a legged mobile robot which enables the robot's feet to land compliantly on rough or inclined terrain, enhances the robot's walking performance, moderates disturbance torques and effectively moderates footfall impacts, while securing a prescribed thrust against the ground and thus avoiding any hindrance to walking.

Further, when the legs of a legged mobile robot are imparted with compliance, they are apt to oscillate or vibrate during walking.

The tenth object of the invention is therefore to provide a locomotion control system for a legged mobile robot which enables the robot's legs to be imparted with compliance without giving rise to oscillation or vibration of the legs during walking.

For realizing this object, the present invention provides a legged mobile robot having a body and a plurality of legs each connected to the body, wherein the improvement comprises, the body and the individual legs being connected with each other through an impact absorption mechanism including an elastic member in such a manner that the body and the individual legs are made displaceable with each other to absorb external force acting at least on either of the body and the individual legs.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

Embodiments of the invention will now be explained based on a biped walking robot as an example of a legged mobile robot.

Figure 1:
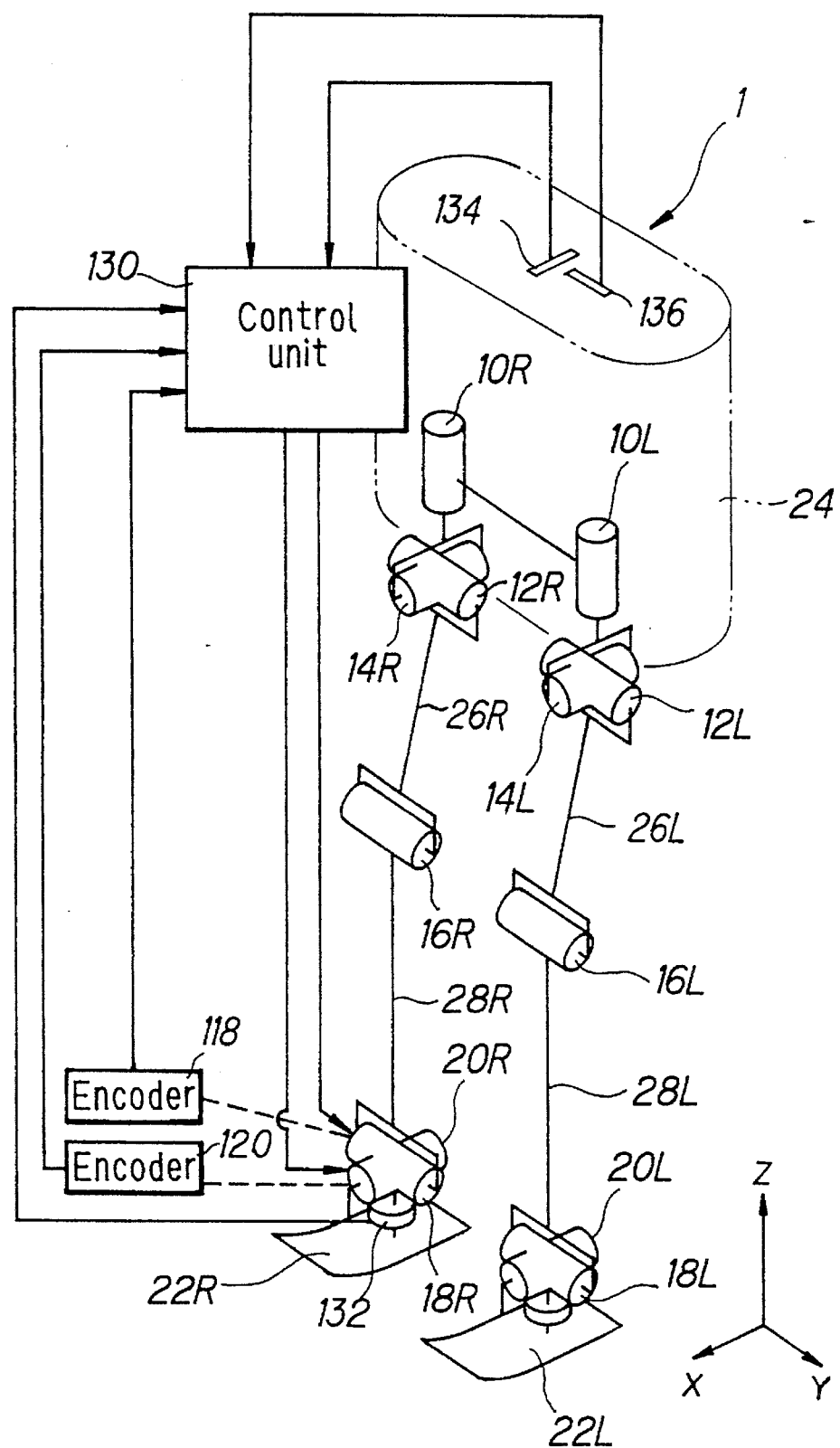
FIG. 1 is a schematic view showing the overall configuration of a legged mobile robot to be equipped with an impact absorption mechanism or a foot structure according to the invention.

An overall skeleton view of a biped robot 1 is shown in FIG. 1. The robot 1 has left and right legs each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the roll direction (rotation about the y axis), joints (axes) 14R, 14L for rotation at the hip in the pitch direction (rotation about the x axis), joints (axes) 16R, 16L for rotation at the knee in the roll direction, joints (axes) 18R, 18L for rotation at the ankle in the roll direction and joints (axes) 20R, 20L for rotation at the ankle in the pitch direction. Feet 22R, 22L are provided at the lower end of this arrangement and a body (main unit) 24 housing a control unit 130 is provided at the upper end. The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 26R, 26L and the knee joints and ankle joints by crus links by 28R, 28L.

The leg links of the respective legs thus have six degrees of freedom, so that during locomotion the legs as a whole can be caused to execute the desired motion by driving the 6×2=12 joints (axes) to appropriate angle. The robot is thus capable of walking freely within three dimensional space.

Figure 2:
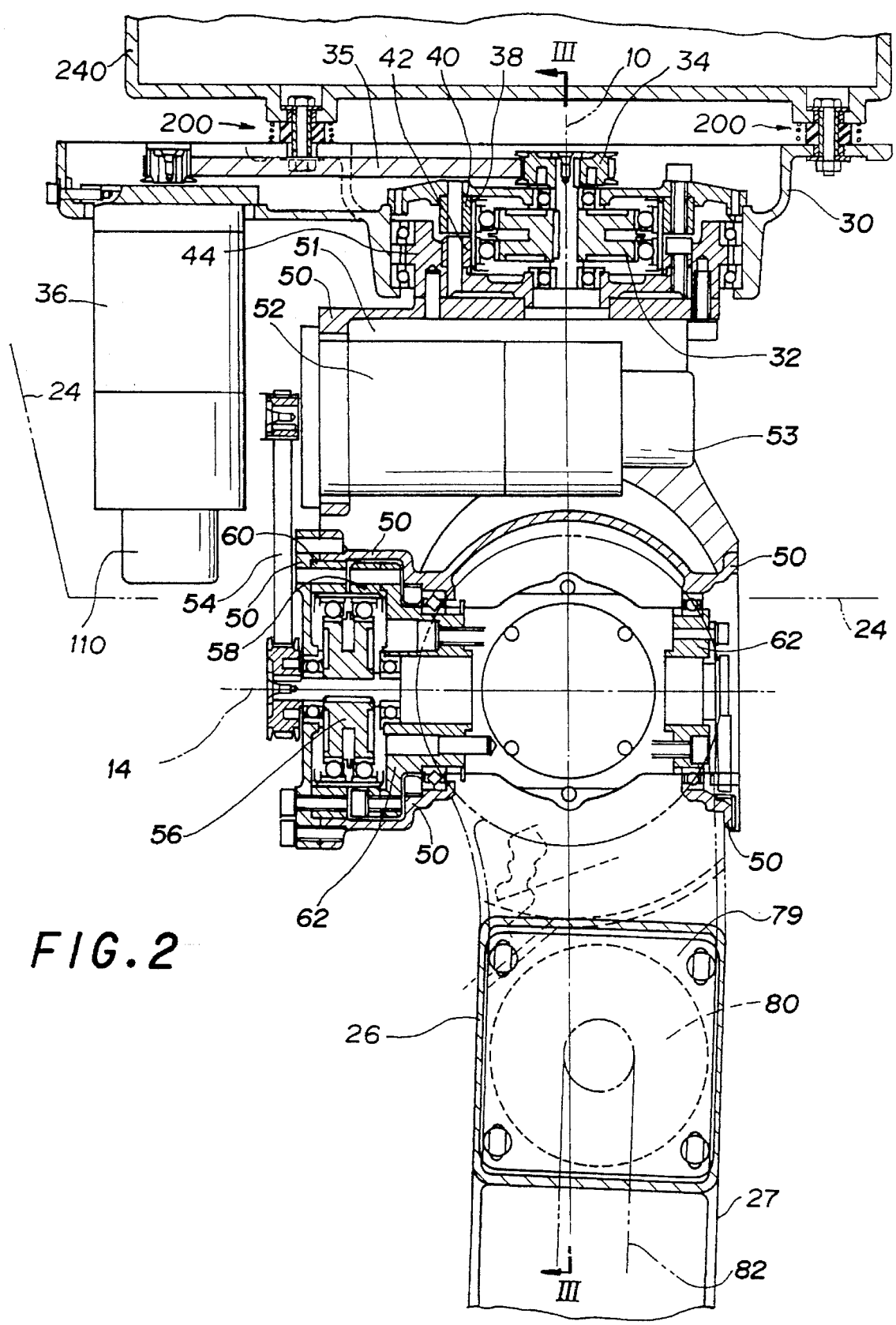
FIG. 2 is a sectional view showing the details of a hip joint construction of the robot illustrated in FIG. 1.

The configuration will now be explained more specifically with respect to FIG. 2 and later figures. As shown in FIG. 2, the body or main unit 24 is mounted on a pelvic plate 30 analogous to the human pelvis and, through the pelvic plate 30, is connected with the left and right legs to constitute a mobile means. Since, as can be seen in FIG. 1, the legs, including their hip joints, are symmetrically disposed, the ensuing explanation will focus on only one leg. The pelvic plate 30 houses a first Harmonic drive (gear reduction mechanism) 32 whose input shaft is fitted with a pulley 34 driven by a first electric motor 36 via a belt 35. Rotation of the input shaft of the first Harmonic drive 32 produces relative motion between a flex ring 38 and the S side (fixed side) 40 and the D side (drive side) 42 of a circular spline, whereby the rotation of the first electric motor 36 is speed-reduced in the well known manner. Since the S side 40 of the circular spline is bolted to the pelvic plate 30 and the D side 42 thereof is bolted to an output member 44, the rotation of the first electric motor 36 causes the pelvic plate 30 and the output member 44 to rotate relative to each other about the joint axis 10.

A first yoke member 50 is fixed to the bottom of the output member 44. The upper part of the first yoke member 50 is formed with a cavity 51 which accommodates a laterally oriented second electric motor 52. The output of the second electric motor 52 is transferred via a belt 54 to a second Harmonic drive 56 situated below the second electric motor 52. The Harmonic drive 56 operates similarly to the first to apply the input rotation to the D side 58 of the circular spine at reduced speed and increased torque. As the S side 60 of the second Harmonic drive 56 is bolted to the bottom of the first yoke member 50 and the D side 58 thereof is fixed via an output member 62 to the upper end of a thigh link 26, the output of the second electric motor 52 causes the first yoke member 50 and the thigh link 26 to rotate relative to each other. In the figure, the thigh link 26 is rotated about the joint axis 14 (the pitch axis). The first yoke member 50 is formed on the right near the bottom with a bearing which supports the thigh link 26 in cooperation with the output member 62.

Figure 3:
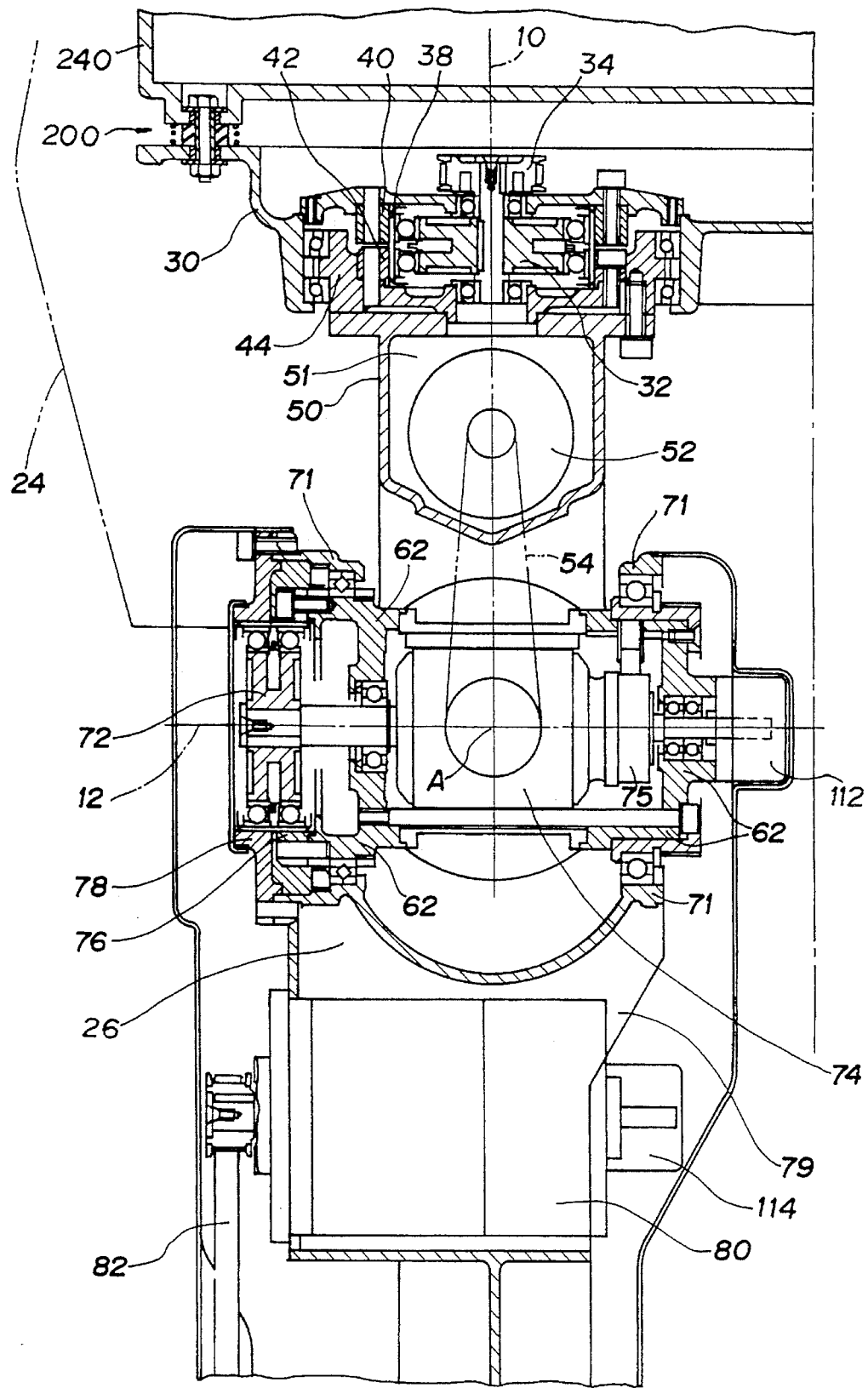
FIG. 3 is a sectional view taken along the line of III—III of FIG. 2.

As can be seen in FIG. 3 (a sectional view taken along line III—III in FIG. 2), the upper part of the thigh link 26 is formed into a yoke member 71, and a third Harmonic drive 72 and a third electric motor 74 connected laterally in series are supported across the left and right sides of the yoke. The S side of the circular spline of the third Harmonic drive 72 is connected to the output member 62 and the D side 78 thereof is connected to the second yoke member 71. As a result, the output of the third electric motor 74 produces relative rotation between the output member 62 and the second yoke member 71, causing the thigh link 26 to rotate about the axis 12 (the roll axis). As can be seen in the figures, the axes 10, 12 and 14 meet at right angles at a single point in the hip, making it possible to calculate their angular positions by conversion in the Cartesian coordinate system. The upper end of the thigh link 26 is formed with a recess 79 for housing a fourth electric motor 80 whose output is applied through a belt 82 to a knee joint to be explained later.

Figure 4:
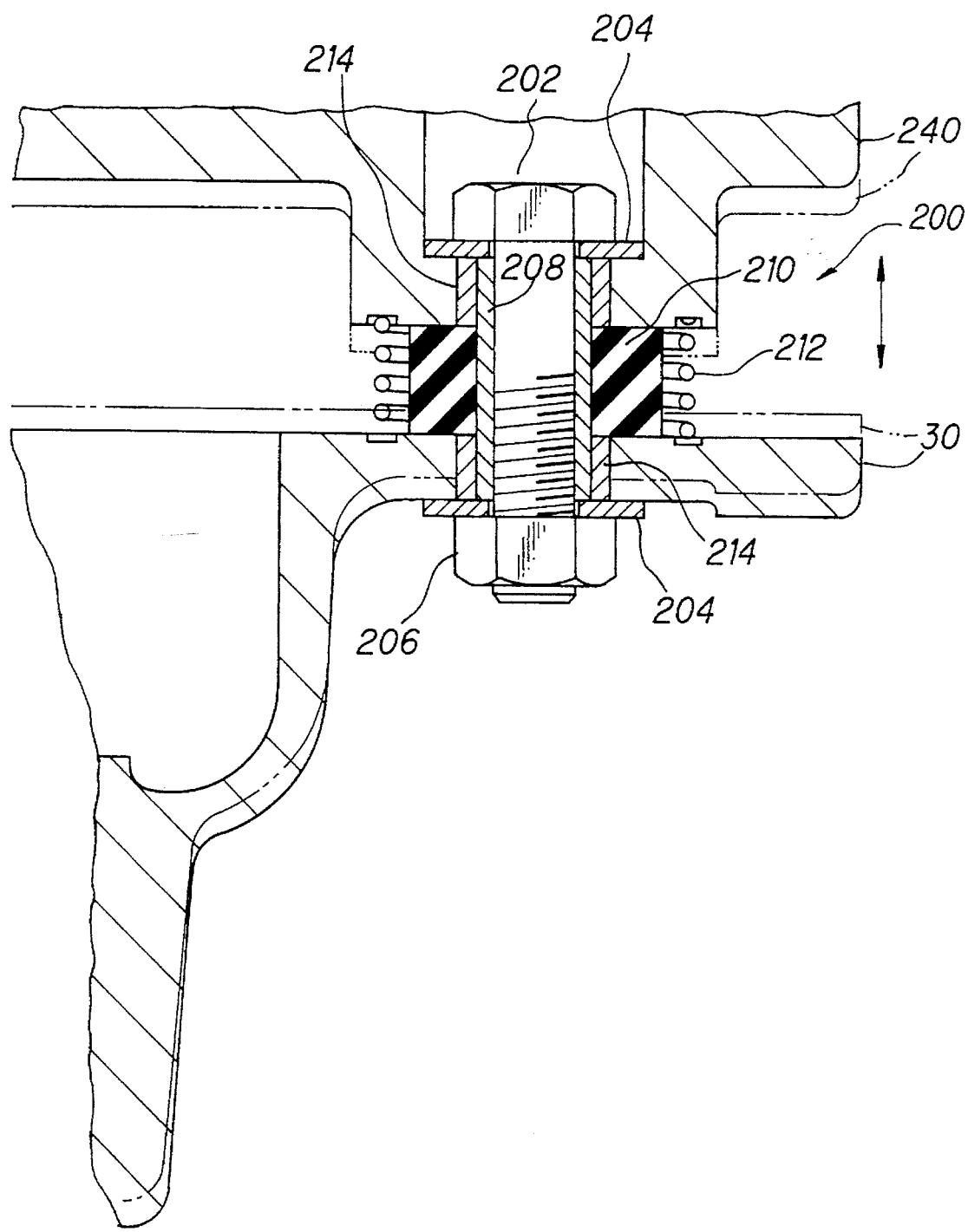
FIG. 4 is an enlarged, partial sectional view of FIG. 2 showing a first impact absorption mechanism according to a first embodiment of the invention.

The distinguishing feature of the arrangement here is the provision of an impact absorption mechanism 200 interconnecting the main unit 24 and the pelvic plate 30 of the leg link. An enlarged sectional view of the essential portion of the impact absorption mechanism 200 is shown in FIG. 4. As illustrated, holes are formed in the bottom plate 240 of the main unit 24 and the pelvic plate 30 on the leg side at portions of a prescribed thickness, and the bottom plate 240 and the pelvic plate 30 are connected to each other by a combination of a bolt 202 passed through the two holes, two washers 204, 204, and a nut 206. A cylindrical shaft 208 is fitted on the bolt 202, a round elastic body 210 made of rubber or the like is fitted on the shaft 208, and a round compression spring 212 is fitted on the elastic body 210. Metal bushings (dry bushings) 214, 214 are inserted between the shaft 208 and the walls of the holes in the bottom plate 240 and the pelvic plate 30, for reducing friction. With this arrangement, when an external force of larger than a prescribed value acts on the leg link, during footfall for example, the pelvic plate 30 and bottom plate 240 are displaced as indicated by the phantom lines, whereby the external force is absorbed and moderated. Since the pelvic plate 30 and bottom plate 240 are bolted together via the shaft 208 at the hole portions, where the pelvic plate 30 and the bottom plate 240 are greater than a prescribed thickness, they can move relative to each other only in the vertical direction (along the z axis), thus enabling absorption and moderation of impacts only in the up/down direction. Since there is no movement in the x-y plane, the attitude of the robot is not destabilized. Moreover, as will be explained later, no problem arises regarding positional calculation relative to the coordinate axes.

Figure 5:
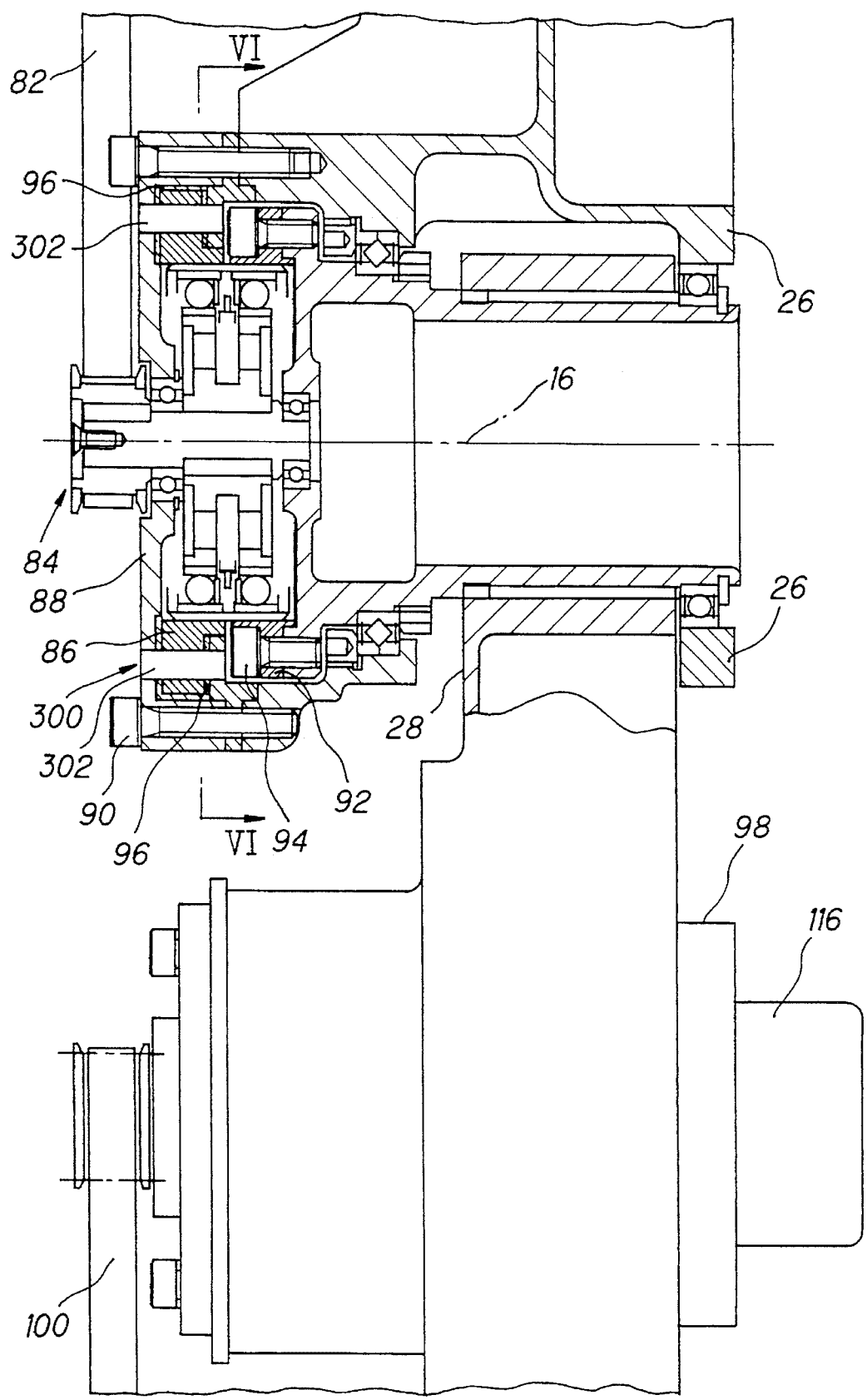
FIG. 5 is a sectional view showing the details of a knee joint construction of the robot illustrated in FIG. 1.

The knee joint will now be explained with reference to the detailed sectional views thereof in FIGS. 5 and 6. As shown in FIG. 5, the output of the fourth electric motor 80 installed in the thigh link 26 is transmitted through the belt 82 to the input shaft of a fourth Harmonic drive 84 at the knee joint 16. The fourth Harmonic drive 84 speed-reduces the motor output at a prescribed ratio and, on the one hand, transmits it through the S side 86 of the circular spline, a second impact absorption mechanism 300 (to be explained later) and an output member 88 to the thigh link 26 fastened to the output member 88 by a bolt 90, and on the other hand, through the D side 92 to a crus link 28 fastened to the D side 92 by a bolt 94. As a result, the thigh link 26 and the crus link 28 are rotated about the axis of the knee joint 16 in the fore/aft direction, namely the direction perpendicular to the drawing sheet of FIG. 5. In other words, a bearing member is formed at the position of the knee joint at the bottom end of the thigh link 26 and the upper end of the crus link 28 is rotatably accommodated in the bearing member.

The second impact absorption mechanism 300 provided in the knee joint will now be explained. The distinguishing feature of the arrangement here is that at the knee joint one side of the circular spline of the Harmonic drive, in the illustrated case the S side 86, is connected to the adjacent output member 88 through pins 302, in contrast to the arrangement shown in FIGS. 2 and 3 wherein the S side (or D side) of the circular spline of the Harmonic drive is firmly fixed on the adjacent member. Specifically, as shown in FIG. 6 (a sectional view taken along line VI—VI in FIG. 5), the pins 302 are slidably accommodated in oblong holes 304, each of which is fitted with elastic bodies 306 on opposite sides of the pin 302. As a result, the output of the S side 86 of the circular spline of the fourth Harmonic drive 84 is transmitted to the output member 88 through the second impact absorption mechanism 300 constituted of the pins 302, the oblong holes 304 and the elastic bodies 306. A metal bushing 96 for reducing friction is inserted between the S side 86 and the output member 88. The hardness of the elastic bodies 306 should be selected such that in the absence of any external force the output of the speed reducer is transmitted with the pins 302 maintained near the centers of the oblong holes 304, i.e. with almost no deformation of the elastic bodies 306, so that the crus link 28 driven through the other side (the D side 92) of the circular spline is moved by an amount proportional to the motor output. On the other hand, the hardness should be selected such that in the presence of a large ground reaction force on the crus link 28 during footfall, the relative movement between the thigh link 26 and the crus link 28 is produced with the pins 302 being rotated in the direction enabling the elastic bodies 306 in the oblong holes 304 to absorb the external force. As a result, the external force is absorbed in proportion to the displacement of the pins. 302, thus moderating the impact. Particularly noteworthy is that since the displacement occurs around the knee joint (axis) 16, there is substantially no adverse effect on the positioning of the coordinate system. This will be explained later.

Figure 7:
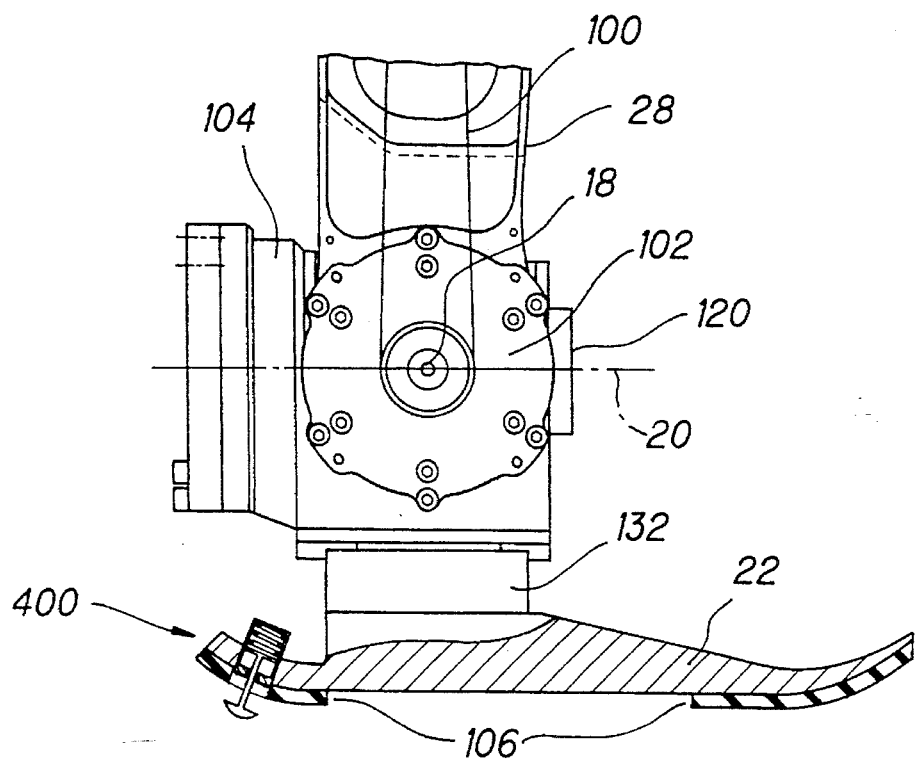
FIG. 7 is a partial sectional explanatory view showing the details of a foot portion of the robot illustrated in FIG. 1.

Moving further down the leg, a fifth electric motor 98 is installed in the crus link 28 at a point near the knee joint 16. Its output is transmitted via a belt 100 to the ankle joint 18 shown in FIG. 7, where it is input to a fifth Harmonic drive 102 for rotating the foot 22 about the axis 18 (roll axis). The foot 22 is further rotated about the axis 20 (pitch axis) by a sixth electric motor (not shown) aligned perpendicularly to the axis 18 and a sixth Harmonic drive 104 driven thereby. The sole of the foot 22 is overlaid with elastic pads 106, 106 for increasing traction and the heel is provided with a third impact absorption mechanism 400 configured in the manner of a shock absorber.

Figure 8:
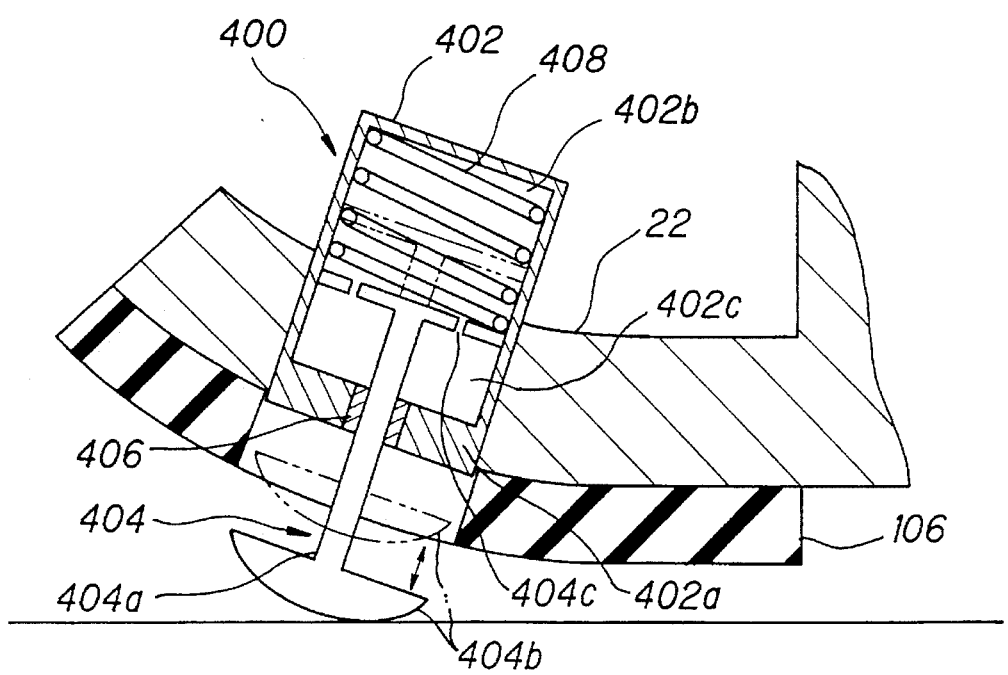
FIG. 8 is an enlarged partial view of FIG. 7 showing a third impact absorption mechanism according to the first embodiment of the invention.
Figure 9:
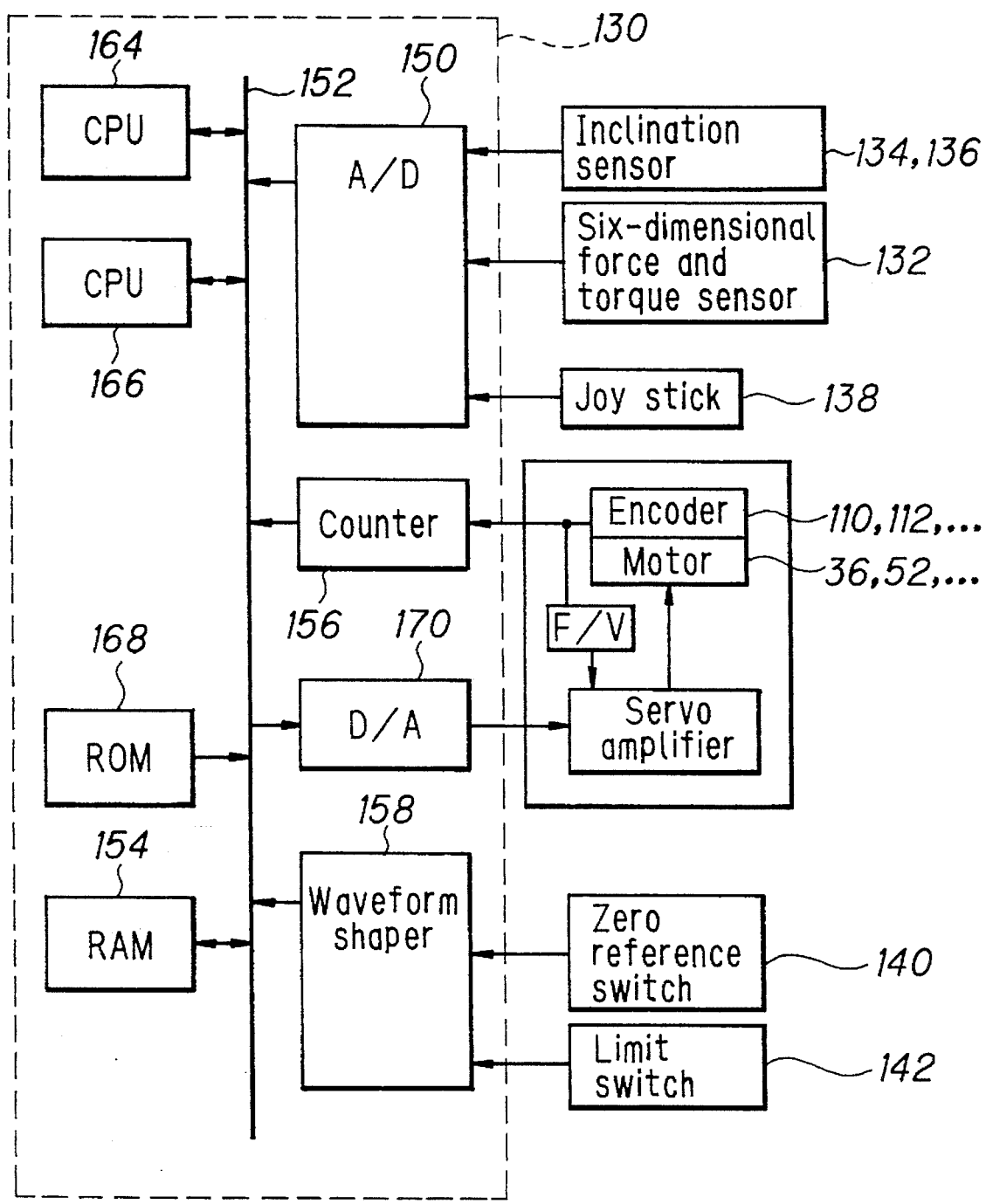
FIG. 9 is a block diagram showing the details of a control unit illustrated in FIG. 1 and for controlling the robot's locomotion.

As can be seen in the enlarged sectional view of FIG. 8, the third impact absorption mechanism 400 is embedded in a hole in the foot 22. It includes a cylinder 402 and a piston 404 slidably accommodated therein. The bottom of the cylinder 402 is formed with a thick floor 402a having a center hole fitted with a metal bushing 406 through which a rod 404a of the piston 404 passes. The free end of the rod 404a flares into the shape of a mushroom cap that constitutes a touchdown member 404b. A compression spring 408 presses onto the top of the piston 404 inside the cylinder 402, urging the piston 404 downward in the drawing. The interior of the cylinder 402 is charged with a fluid such as oil. The upper end of the piston divides the interior of the cylinder 402 into an upper chamber 402b and a lower chamber 402c and is provided with passages 404c for the passage of the oil between the two chambers. An oil-tight seal is formed between the piston rod 404a and the floor 402a (the metal bushing 406).

When the foot 22 of the free leg is about to land, the touchdown member 404b of the piston 404, which is the first to make contact with the ground, drives the piston 404 upward against the force of the compression spring 408. This compresses the oil and causes it to pass through the passages 404c and gradually transfer from the upper chamber 402b to the lower chamber 402c. The impact received by the robot 1 at footfall is thus absorbed and moderated by the force of the spring and the resistance of the oil. At the time of the ensuing footrise, the compression spring 408 returns the piston 404 to its initial position, causing the oil to return to the upper chamber 402b and prepare the third impact absorption mechanism 400 for the next footfall. Since the floor 402a of the cylinder 402 is formed to be thick and an oil seal is formed between it and the piston rod 404a, the movement of the piston rod 404a is restricted to one direction. The third impact absorption mechanism 400 therefore does not tend to destabilize the attitude of the robot 1 at the time of footfall.

The operations for controlling the locomotion of the robot shown in FIG. 1 will now be briefly explained. As shown in FIGS. 1 to 7, each of the robot's motors is equipped with a rotary encoder 110, 112, 114, 116, 118 or 120 for detecting the amount of motor rotation. (Only encoders 118, 120 are illustrated in FIG. 1). The outputs of the encoders are sent to the control unit 130 located in the main unit 24. Further, each foot 22 is equipped with a six-dimensional force and torque sensor 132 for detecting the x, y and z direction force components transmitted to the robot 1 through the foot and the movement component around each of the x, y and z axes, thus enabling discernment of whether or not footfall is in progress and of the magnitude of the forces or moments acting on the supporting leg. In addition, a pair of inclination sensors 134, 136 are disposed on top of the main unit 24 for detecting the inclination angular velocity with respect to the z axis in the x-z and y-z planes. Further, although not illustrated in FIG. 1, the robot 1 is provided with a Joy stick 138 to be used for modifying the robot's walking, a zero reference switch 140 for setting the robot's beginning attitude (upright) and a limit switch 142 for preventing overruns. The outputs of the sensors 132 and the like are also sent to the control unit 130.

As shown in the block diagram of FIG. 2, the control unit 130 has a microcomputer. The outputs from the inclination sensors 134, 136 etc. converted into digital signals by an A/D converter 150 and the resulting digital values are sent via a bus 152 to a RAM (random access memory) 154 for storage. In addition, the outputs of the encoders 110 etc. disposed adjacent to the respective electric motors are input to the RAM 154 through a counter 156, while the outputs of the zero reference switch 140 and the like are stored in the RAM 154 via a waveform shaper 158. The control unit 130 has a first CPU 164 and a second CPU 166. The first CPU 164 fetches a walking pattern predesigned in terms of joint trajectories from a ROM (read-only memory) 168 and computes target joint angles and the like as will be explained later and sends the same to the RAM 154. The second CPU 166 reads out the values from the RAM 154 and measured values learned from the encoders, computes control values and sends the same to the aforesaid individual joint motors through a D/A converter 170 and associated servo amplifiers.

Owing to the foregoing configuration, specifically because of the first to third impact absorption mechanisms, the present embodiment can effectively absorb and moderate impacts acting on the robot 1 at such times as footfall. This absorption of impact contributes to stabilization of the attitude of the robot 1, reduces the load on the Harmonic drives, bearings etc. at the respective joints, and protects the control unit and other precision electronic components housed in the main unit 24 from shock. Moreover, the second impact absorption mechanism 300 further absorbs and moderates the inertial force produced by swinging of the free leg. Since the first impact absorption mechanism 200 restricts displacement to that along the z axis and the second impact absorption mechanism 300 provided at the knee allows displacement about the knee joint axis 16, the displacements occurring during impact absorption have almost no effect on the calculation of positions in the coordinate systems of the respective joints. Although this would not be true and large differences would arise between the actual and calculated positions of the respective joints if impact absorption should be achieved by reducing the rigidity of the links, in the configuration according to the present embodiment almost no discrepancy arises relative to the actual values.

While the embodiment described in the foregoing is provided with all of the first to third impact absorption mechanisms, it is alternatively possible to use only one or two of them. For instance, it is possible to provide only the second impact absorption mechanism 300. It should also be noted that the invention is not limited to the use of rubber as the material for the first and second impact absorption mechanisms 200, 300 and that any of various other materials exhibiting viscous properties can be employed instead. In addition, since the first impact absorption mechanism 200 constitutes a spring/damper system, the compression spring 212, being disposed around the elastic body 210, can be omitted without departing from the gist of the invention. It is also possible to connect the second impact absorption mechanism 300 with the D side instead of the S side of the circular spline of the Harmonic drive.

Figure 6:
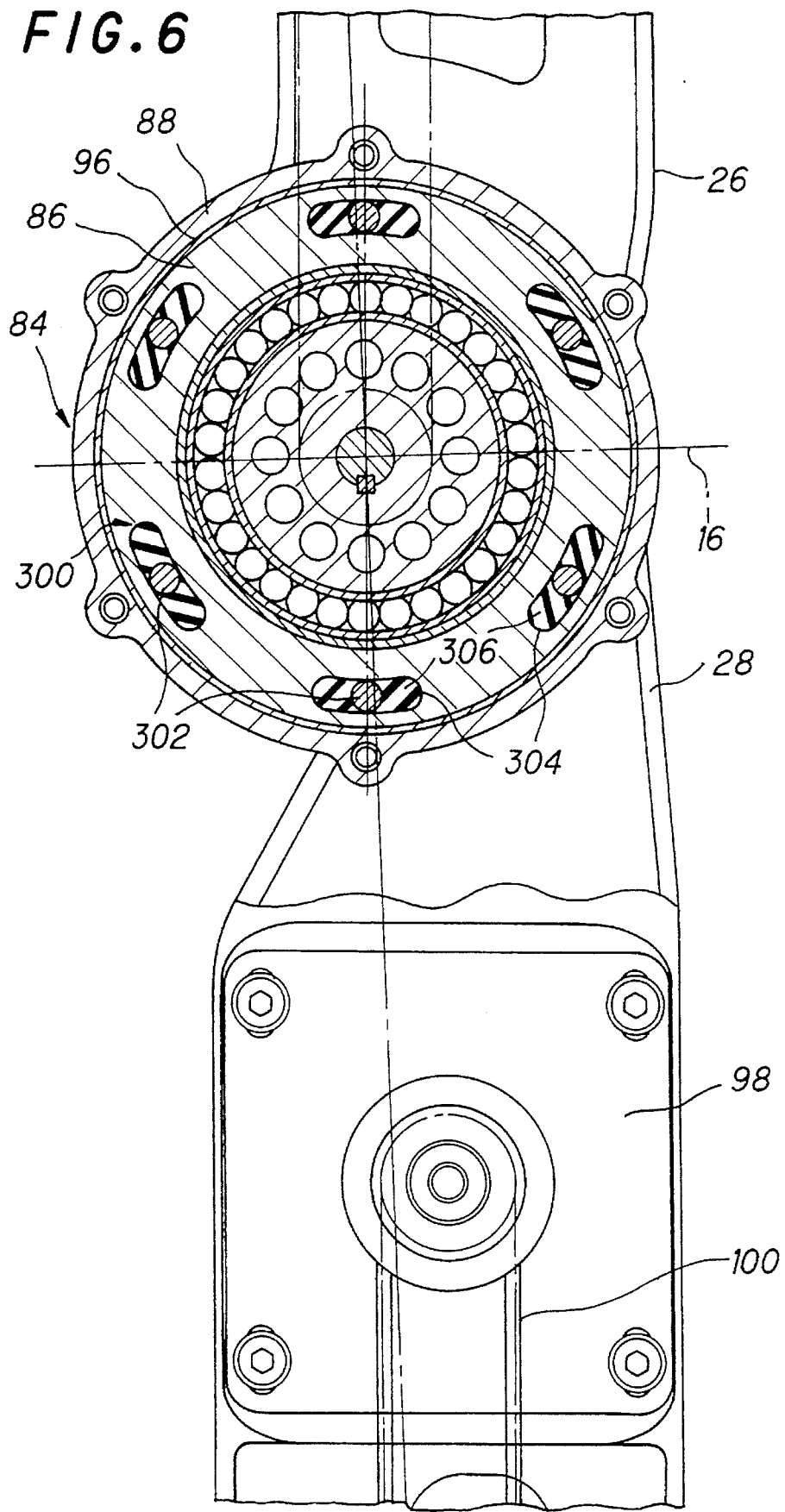
FIG. 6 is a sectional view taken along the line of VI—VI of FIG. 5 showing a second impact absorption mechanism according to the first embodiment of the invention.
Figure 10:
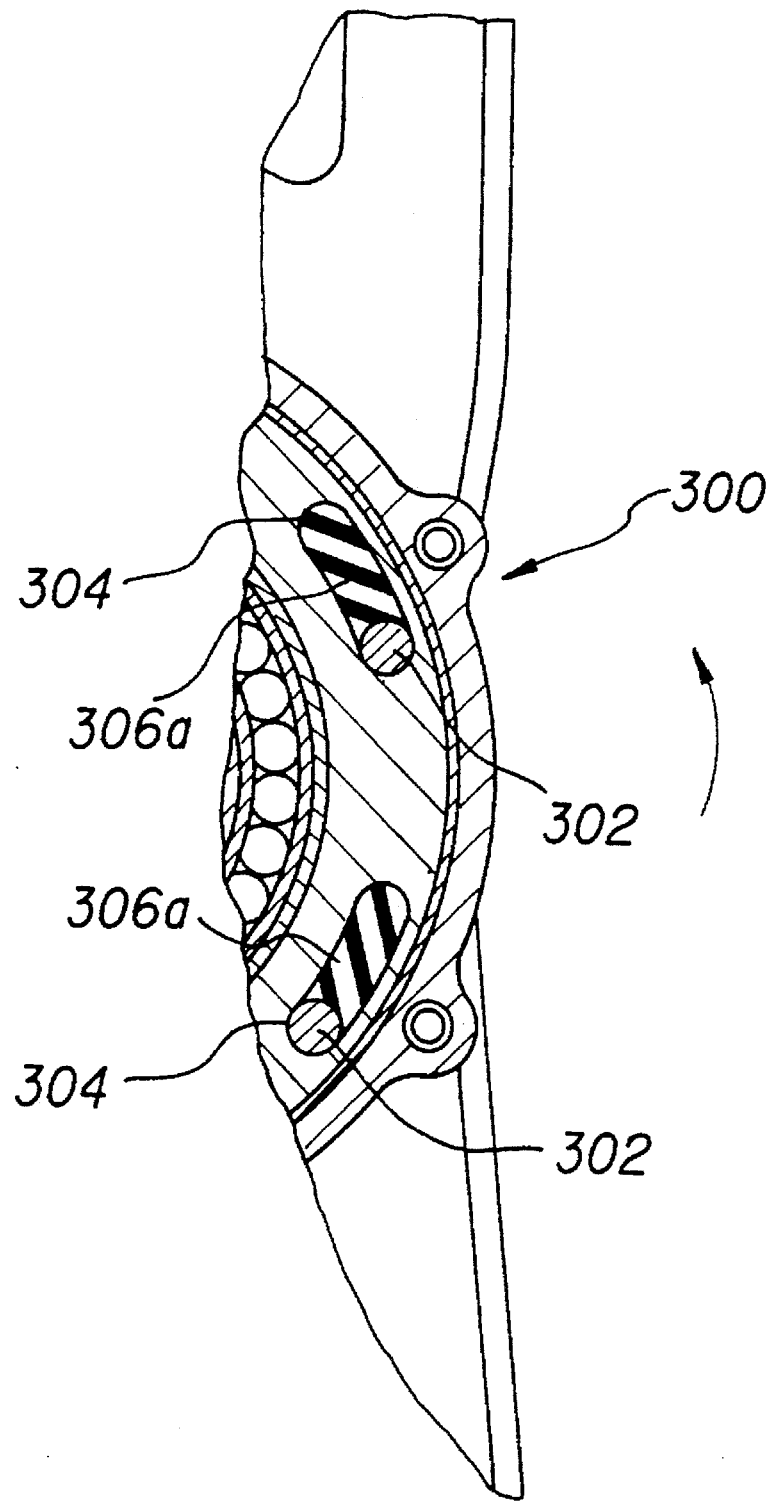
FIG. 10 is an enlarged partial sectional view, similar to FIG. 6, but showing a second embodiment of the invention.

A second embodiment of the invention is shown in FIG. 10, which is a sectional view of the essential part of the knee joint structure similar to FIG. 6. In this embodiment the elastic bodies 306 of the second impact absorption mechanism 300 disposed at the knee joint as shown in FIG. 6 are replaced with elastic bodies 306a which position the pins 302 at the clockwise extremities of the oblong holes 304. In this embodiment, the thigh link 26 and the crus link 28 can be displaced relative to each other only in the direction indicated by the arrow. Thus, while the direction of impact absorption is limited, the distance that the pins 302 can move is increased, with an increase in the potential amount of impact absorption.

Figure 11:
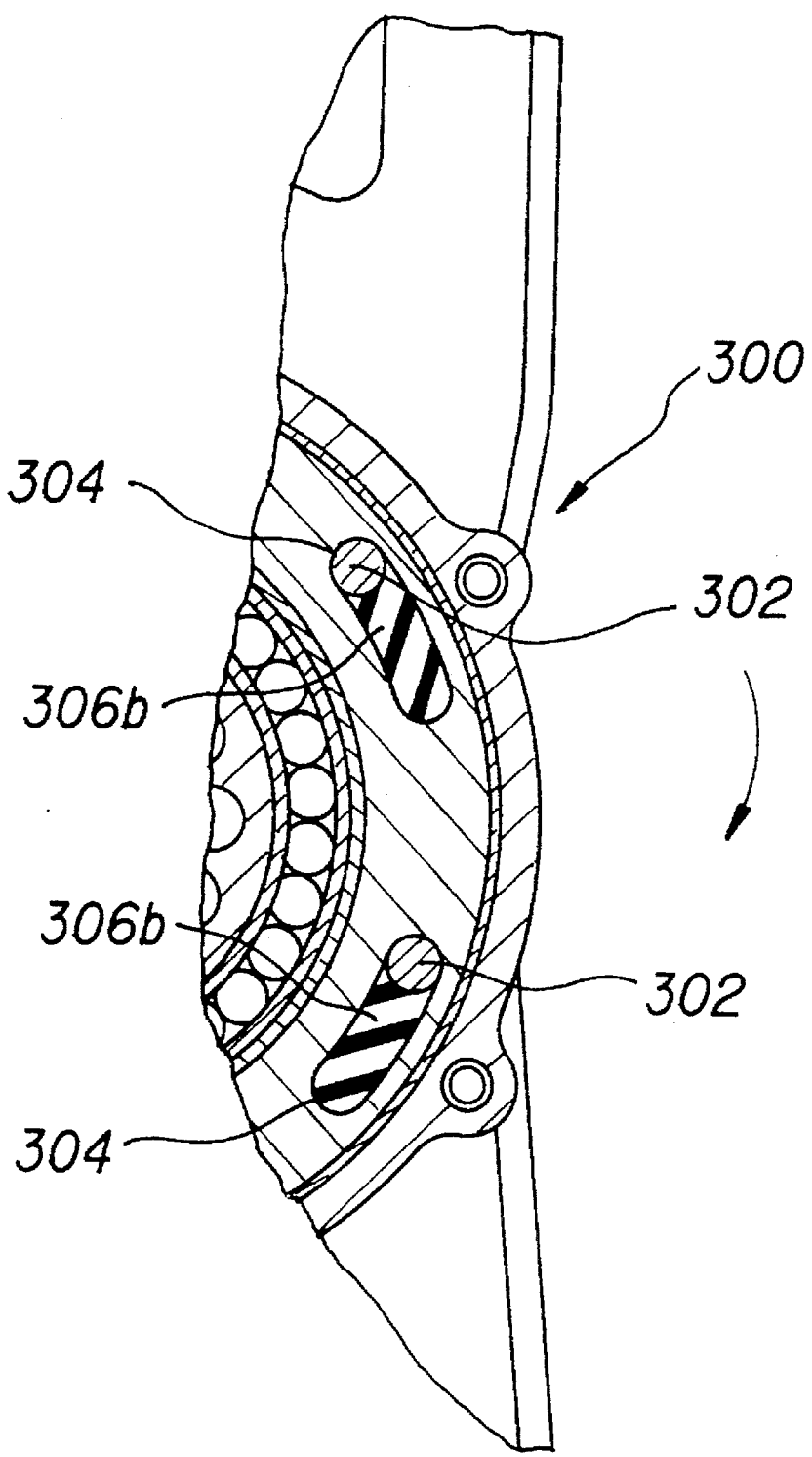
FIG. 11 is an enlarged partial sectional view, similar to FIG. 6, but showing a third embodiment of the invention.

A third embodiment of the invention is shown in FIG. 11, which is a sectional view of the essential part of the knee joint structure also similar to FIG. 6. Reversely from in the second embodiment, in this embodiment the elastic bodies 306 of the second impact absorption mechanism 300 disposed at the knee joint as shown in FIG. 6 are replaced with elastic bodies 306b which position the pins 302 at the counterclockwise extremities of the oblong holes 304. Aside from the fact that the direction of impact is reversed, the effect is the same as that of the second embodiment.

Figure 12:
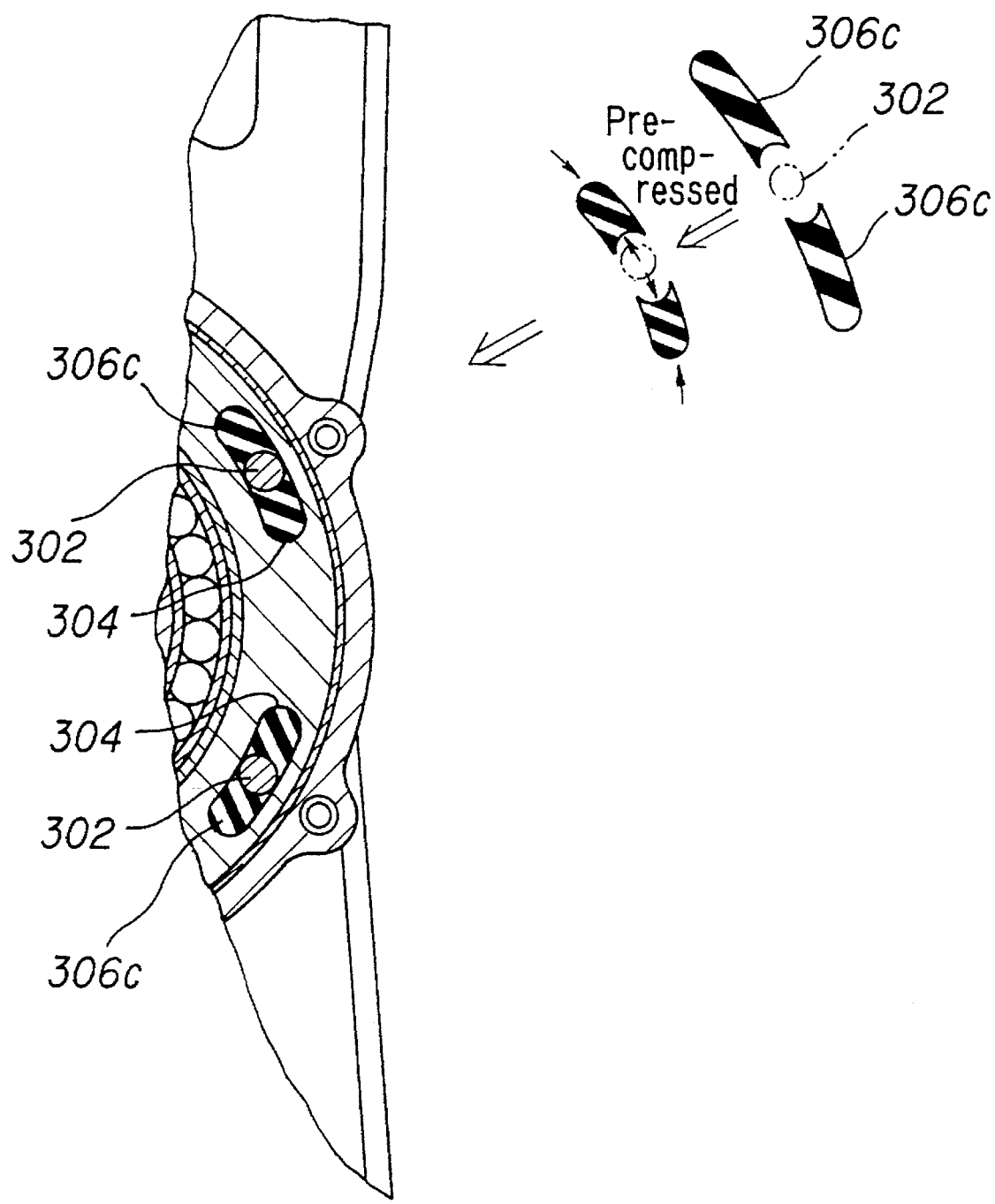
FIG. 12 is an enlarged partial sectional view, still similar to FIG. 6, but showing a fourth embodiment of the invention.
Figure 13:
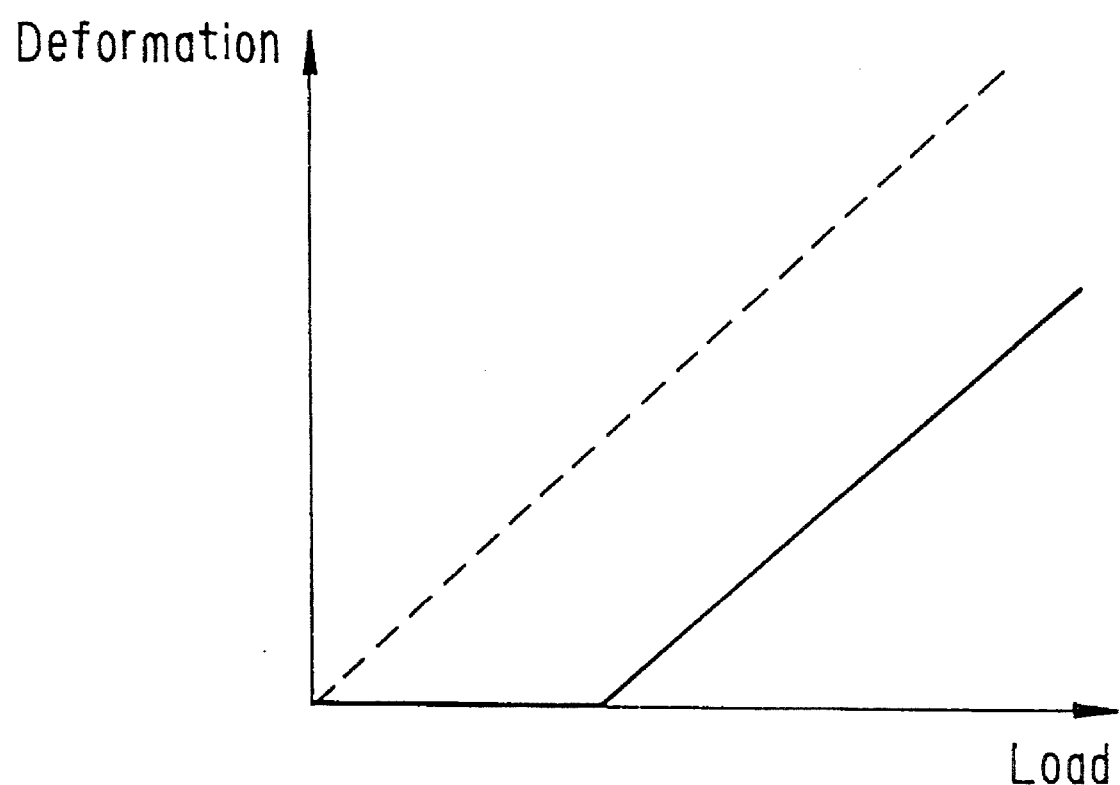
FIG. 13 is a graph showing the load-vs-deformation characteristics of elastic bodies used in the fourth embodiment.

A fourth embodiment of the invention is shown in FIG. 12, which is a sectional view of the essential part of the knee joint structure still similar to FIG. 6. In this embodiment the openings on the opposite sides of the oblong holes 304 of the second impact absorption mechanism 300 are force-fitted with appropriately pre-compressed oversized elastic bodies 306c. As a result, if the bodies 306c are appropriately designed, the load-vs-deformation characteristics of the front and rear elastic bodies 306 become as shown by the solid line in FIG. 13 (as compared with the characteristics under no compression indicated by the broken line). The elastic bodies 306c are designed such that they deform and absorb external forces only when subjected to a load of over a prescribed level.

Figure 14:
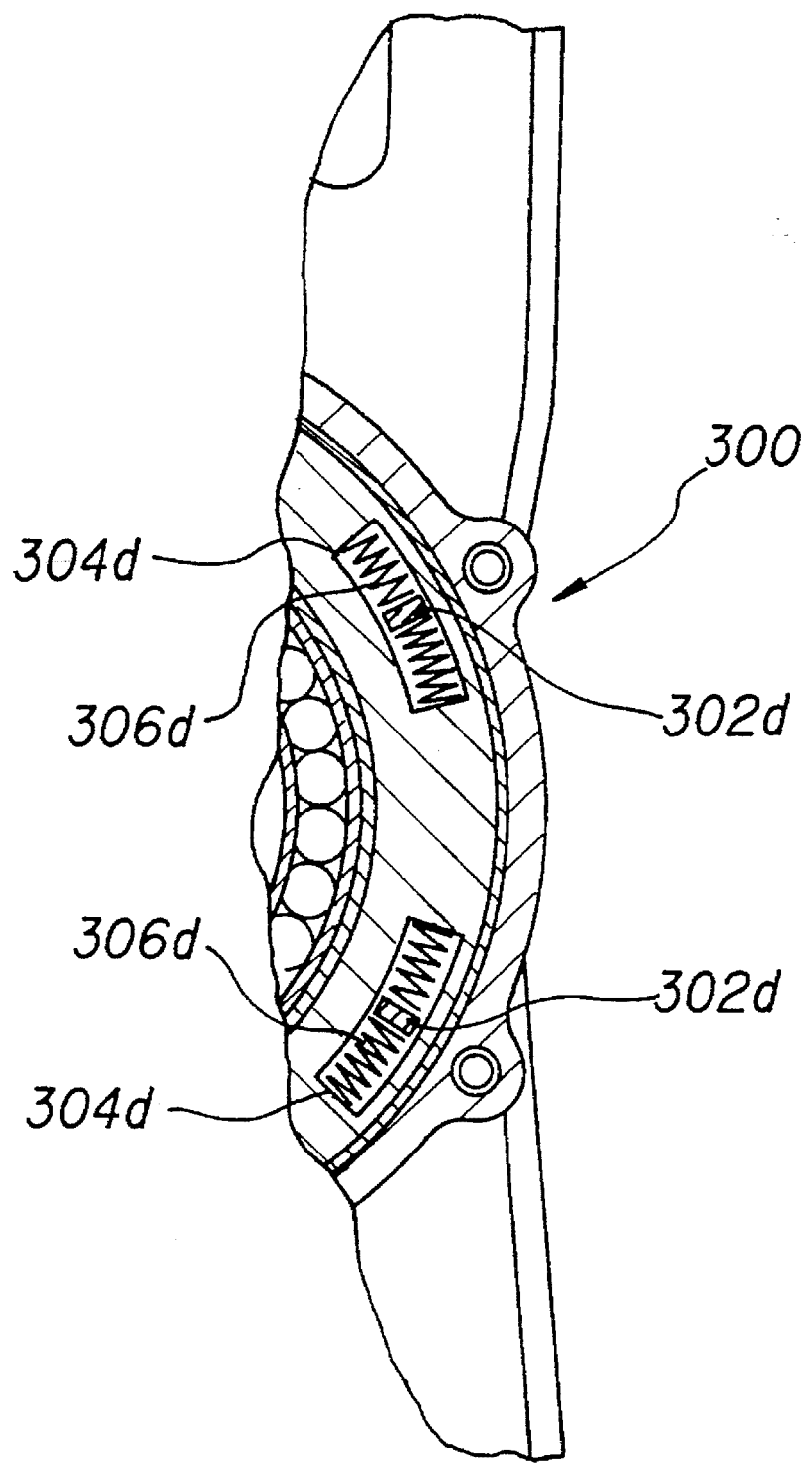
FIG. 14 is an enlarged partial sectional view, yet still similar to FIG. 6, but showing a fifth embodiment of the invention.

A fifth embodiment of the invention is shown in FIG. 14, which is a sectional view of the essential part of the knee joint structure yet still similar to FIG. 6. In this embodiment the oblong holes 304d and pins 302d of the second impact absorption mechanism 300 are formed to have the sectional shapes shown in the drawing and the elastic bodies 306d disposed on either side of each pin 302d are constituted as coil springs. The effect is the same as that of the first embodiment. (Beleville springs can be used in place of coil springs.)

Figure 15:
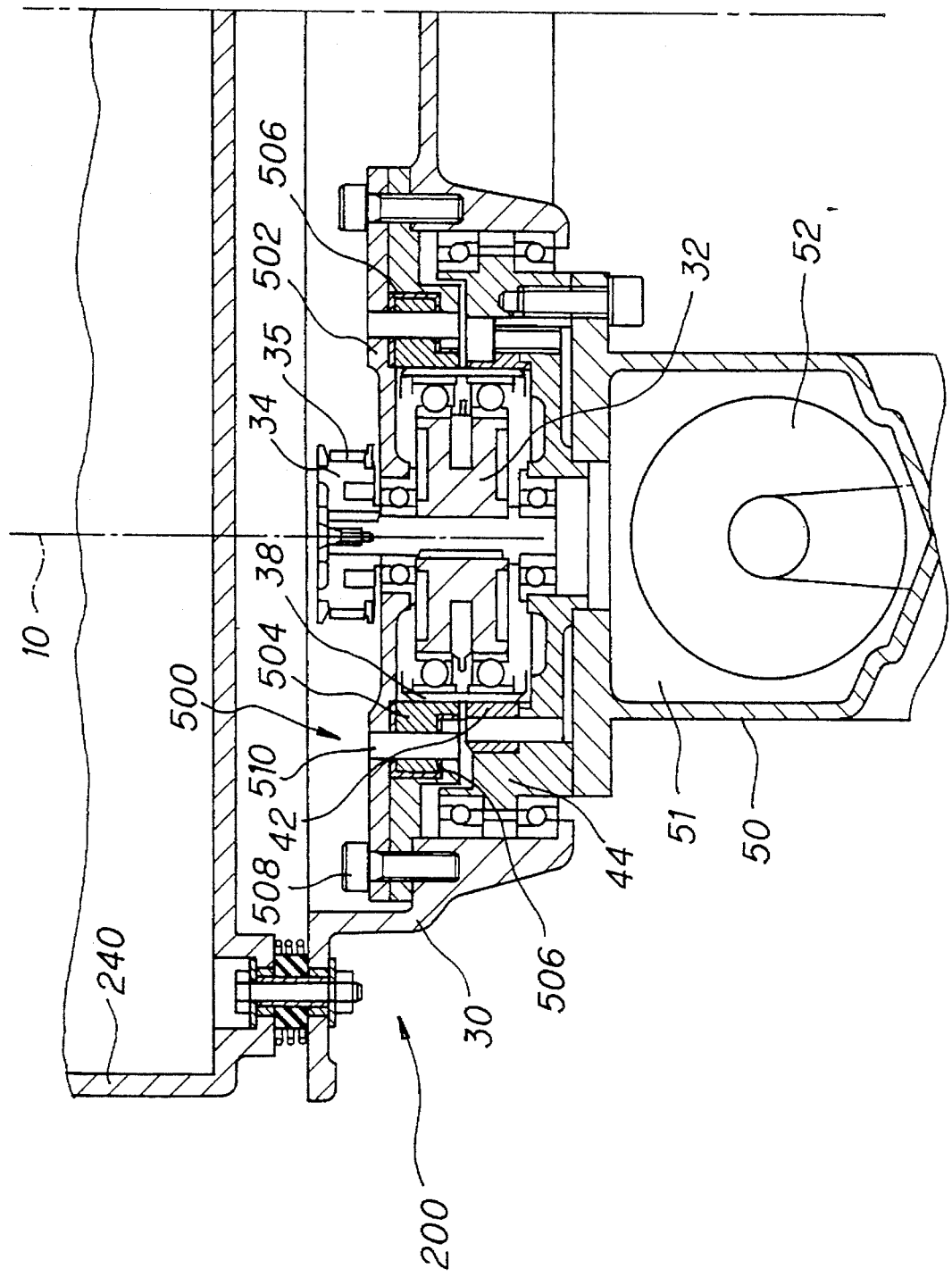
FIG. 15 is an enlarged partial sectional view, similar to FIG. 4, but showing a sixth embodiment of the invention.

A sixth embodiment of the invention is shown in FIG. 15, which is a sectional view similar to FIG. 5 of the essential part of the leg-swivelling hip joint structure. In this embodiment the leg-swivelling hip joint structure is provided with a fourth impact absorption mechanism 500 similar in structure to the second impact absorption mechanism 300 of the first embodiment. The fourth impact absorption mechanism 500 is provided in addition to the first, second and third impact absorption mechanisms 200, 300 and 400 of the first embodiment.

The leg-swivelling hip joint 10 equipped with the fourth impact absorption mechanism 500 will be explained with reference to FIG. 15. As explained in connection with the first embodiment, the pelvic plate 30 houses the first Harmonic drive 32 whose input shaft is fitted with the pulley 34 driven by the first motor 36 (not shown) via the belt 35. Rotation of the input shaft of the first Harmonic drive 32 produces relative motion between the flex ring 38 and the S side (fixed side) 504 and the D side (drive side) 42 of the circular spline, whereby the rotation of the first motor 36 is speed-reduced. Since the S side 504 of the circular spline is connected to the pelvic plate 30 through an output member 502 and the D side 42 thereof is bolted to the output member 44, the rotation of the first motor 36 causes the pelvic plate 30 and the output member 44 to rotate relative to each other about the joint axis 10. The distinguishing feature of the arrangement here is that at the leg-swivelling hip joint 10 on one side of the circular spline of the Harmonic drive, in the illustrated case the S side 504, is connected to the adjacent output member 502 through pins 510, in contrast to the arrangement shown in FIGS. 2 and 3 wherein the S side (or D side) of the circular spline of the Harmonic drive is firmly fixed on the adjacent member and the output of the Harmonic drive is directly transmitted. More specifically, similarly to what is shown in FIG. 6 regarding the second impact absorption mechanism 300 provided at the knee joint in the first embodiment, the pins 510 are slidably accommodated in oblong holes and the openings on either side of the pins 510 are fitted with elastic bodies made of rubber or the like. Thus the output of the S side 504 of the circular spline of the first Harmonic drive 32 is transmitted to the output member 502 through the fourth impact absorption mechanism 500 comprised of the pins 500, the oblong holes and elastic bodies. A metal bushing 506 for reducing friction is inserted between the S side 504 and the output member 502.

The hardness of the elastic bodies should be selected such that in the absence of any external force the output of the Harmonic drive is transmitted to the output member 502 with the pins 510 maintaining their initial positions, i.e. with almost no deformation of the elastic bodies, so that the leg link under the first yoke member driven through the other side (the D side 42) of the circular spline is moved by an amount proportional to the motor output. On the other hand, the hardness should be selected such that in the presence of a large ground reaction force on the leg links during footfall, the relative movement between the pelvic plate 30 and the first yoke member is produced with the pins 510 being rotated in the direction enabling the elastic bodies in the oblong holes to absorb the external force. As a result, the external force is absorbed in proportion to the displacement of the pins 510, thus moderating the impact. Moreover, since similarly to the case of the second impact absorption mechanism 300 of the first embodiment the displacement occurs around the joint (axes) 10, there is substantially no adverse effect on the positioning of the coordinate system.

The first embodiment employs the first impact absorption mechanism 200, the second impact absorption mechanism 300 and the third impact absorption mechanism 400 in combination, while the sixth embodiment further incorporates the fourth impact absorption mechanism 500. However, the legged walking robot equipped with one or more impact absorption mechanisms according to the present invention is not limited to these configurations. Other embodiments can be realized by using any of the other possible combinations of the impact absorption mechanisms or by incorporating only a desired one of the mechanisms.

Figure 16:
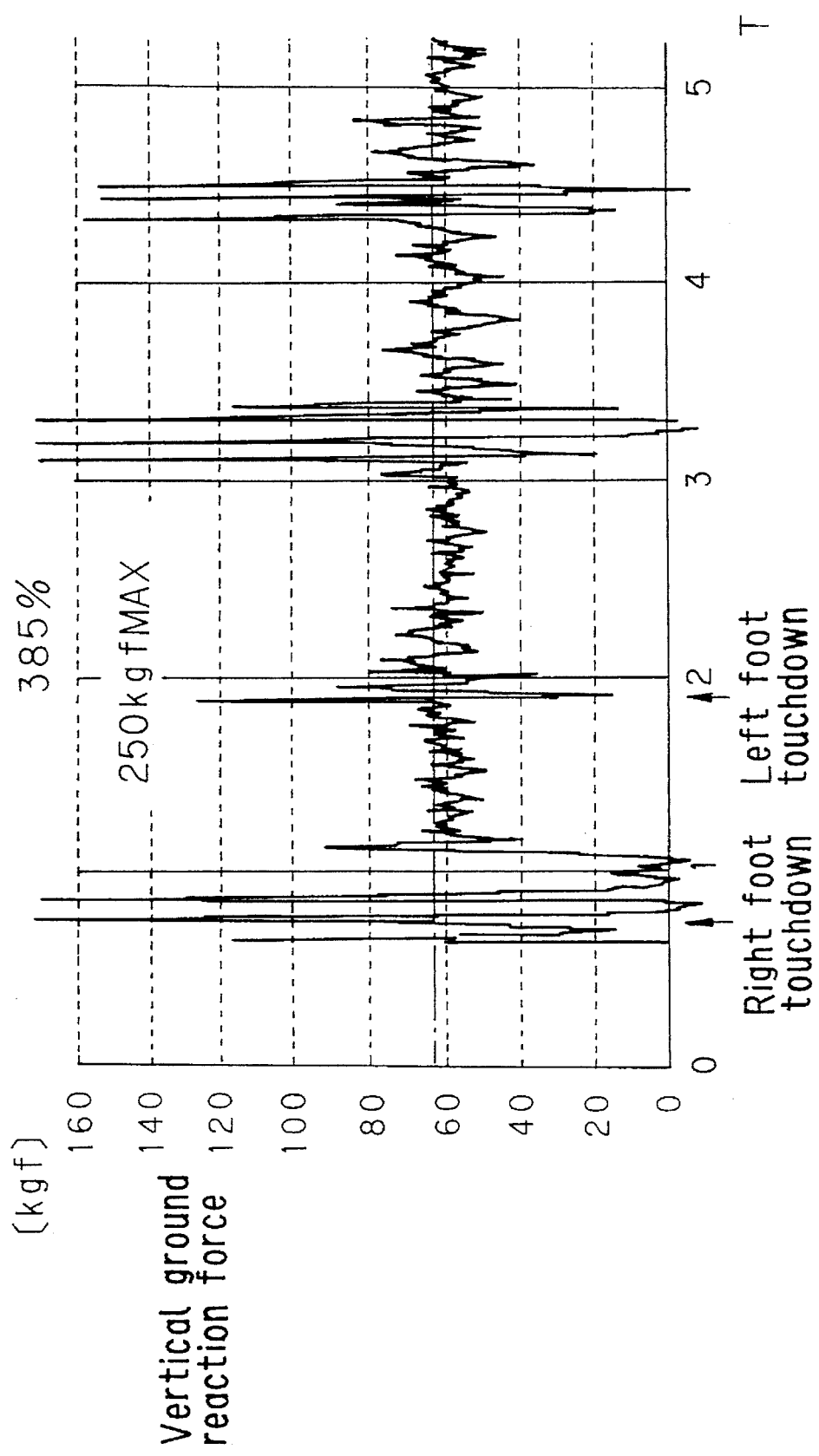
FIG. 16 is test data showing vertical impact acting on the robot in which the robot is not equipped with the aforesaid impact absorption mechanism.
Figure 17:
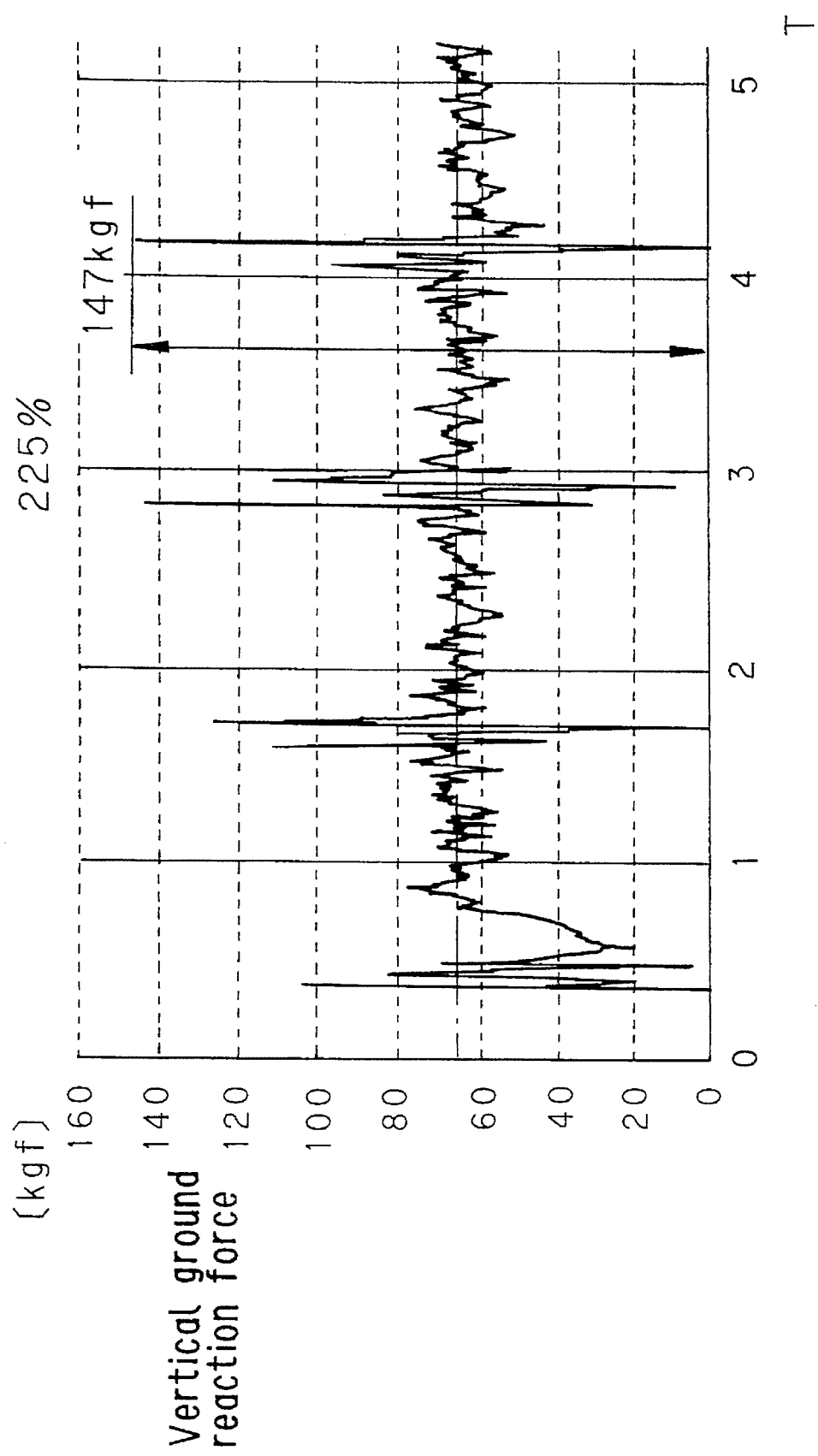
FIG. 17 is test data showing the vertical impact acting on the robot in which the robot is equipped with the aforesaid first impact absorption mechanism.
Figure 18:
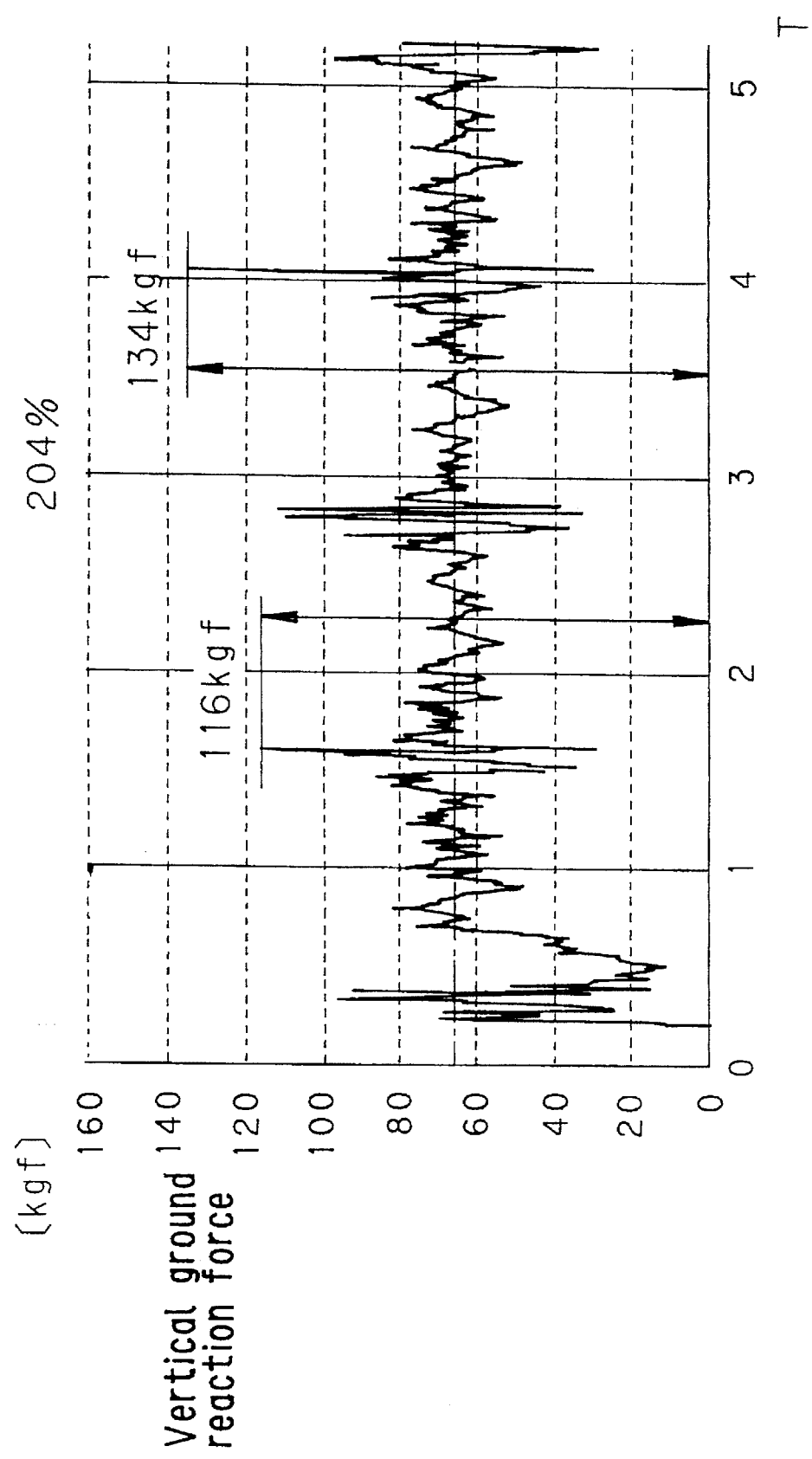
FIG. 18 is test data, similar to FIG. 17, but the robot is equipped with the aforesaid third impact absorption mechanism.

The results of tests conducted in connection with the impact absorption mechanisms are shown in FIGS. 16, 17 and 18. FIG. 16 shows the vertical ground reaction force measured in a legged walking robot not equipped with any of the impact absorption mechanisms. A maximum vertical ground reaction of 250 kgf was measured. This is equivalent to 385% of the robot's weight. FIG. 17 shows the results when the robot was equipped with the first impact absorption mechanism 200 of the first embodiment. This time the maximum vertical ground reaction was 147 kgf, 225% of the robot's weight. FIG. 18 shows the results when the robot was equipped with the third impact absorption mechanism 400. The maximum ground reaction was 134 kgf, 204% of the robot's weight. The results of these tests verifies that the impact absorption mechanisms according to the invention effectively absorb and moderate impact. When a plurality of the impact absorption mechanisms are used, impacts acting on the robot can be absorbed and moderated even more effectively.

Then, as a seventh embodiment, the specifics of the legged mobile robot having foot structure according to the invention will now be explained with reference to FIG. 19 and later figures.

Figure 19:
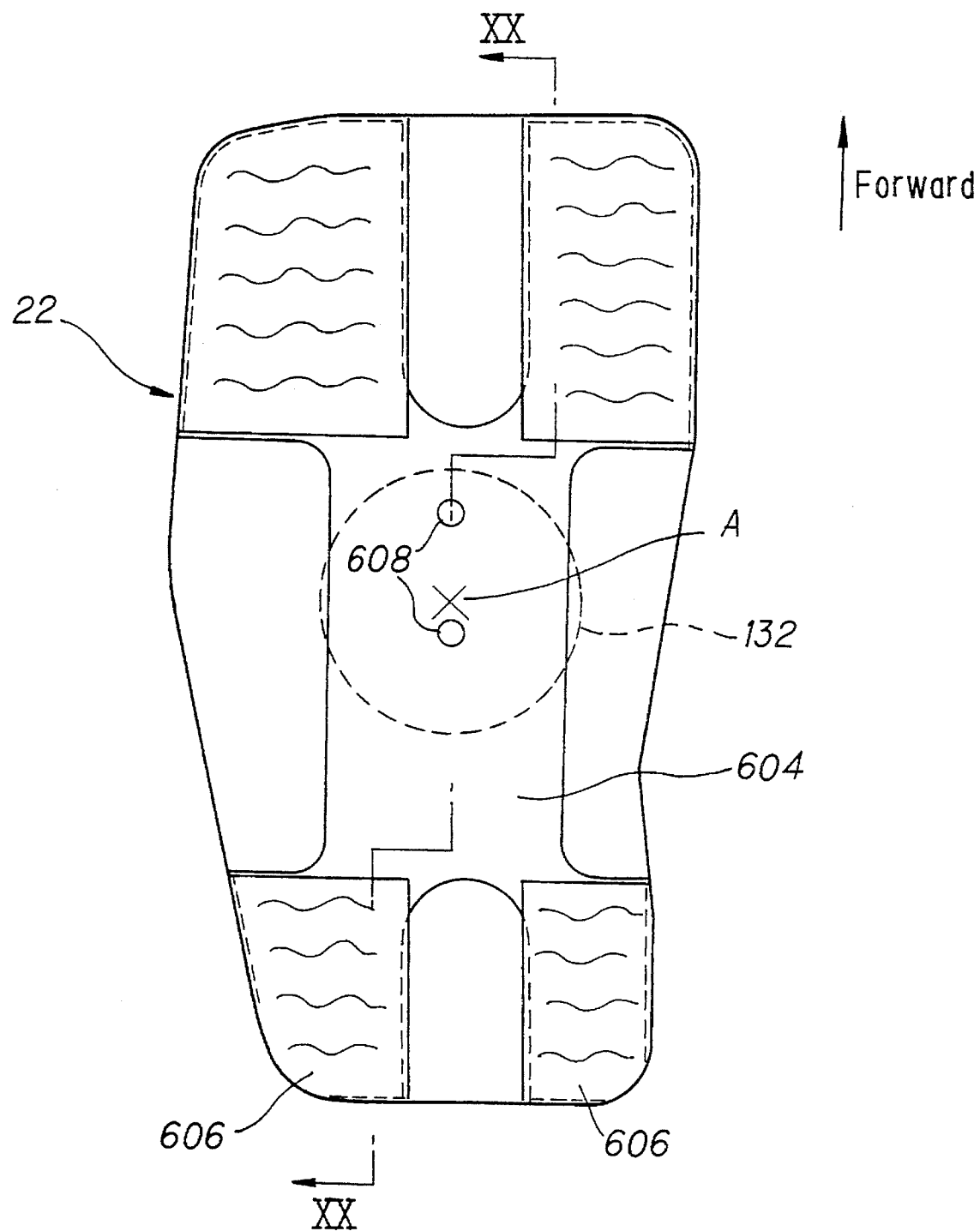
FIG. 19 is a plan view of a foot sole of the robot illustrated in FIG. 1 according to a seventh embodiment of the invention.
Figure 20:
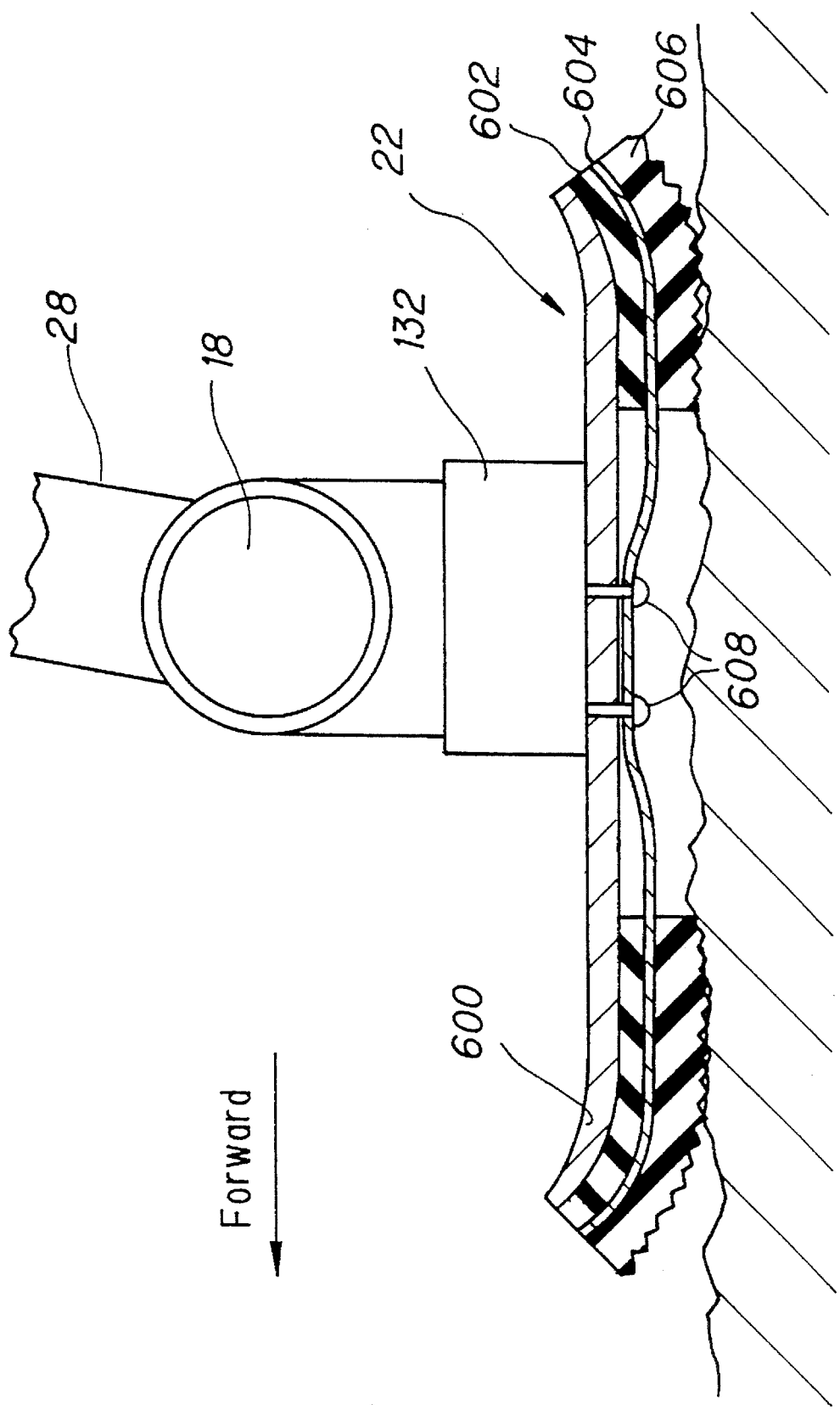
FIG. 20 is a sectional view taken along the line of XX—XX of FIG. 19.

FIGS. 19 and 20 show the seventh embodiment of the invention. FIG. 19 is a bottom view showing the sole of the foot 22 (the labels R and L will be still dropped since the two feet are symmetrical) and FIG. 20 is a sectional view taken along line XX—XX of FIG. 19. The foot 22 comprises a foot plate 600 that is bowed upward slightly at the toe (end pointing forward in the figure) and at the heel. The undersurface of the foot plate 600 is overlaid with first elastic pads 602, a plate spring 604 is fixed in contact with the bottom surface of the first elastic pads 602, and second elastic pads 606 are attached to the bottom surfaces of the plate spring 604. The first and second elastic pads 602, 606 are formed of rubber and are disposed at the four corners of the sole. The hardness of the rubber of the first elastic pads 602 is selected to be about 40, which is relatively soft and enables maximum absorption of impact (ground reaction force) at the time of footfall. On the other hand the hardness of the second elastic pads 606 is selected to be about 70–90, which is relative hard and enables a large frictional force to develop between the second elastic pads 606 and the ground surface.

Thus the foot is constituted using two types of rubber so as to obtain a strong ground gripping force while also moderating footfall impact. With this foot structure, the aforementioned spin force acting around the vertical (z) axis at the time of footfall tends to deform the first elastic pads 602 in the x and y directions parallel to the ground surface and thus to destabilize the robot's attitude. This tendency is prevented, however, by the presence of the plate spring 604 sandwiched between the two types of elastic pads. More specifically, although the plate spring 604 is notched as shown in FIG. 19, it nevertheless covers substantially the whole of the sole. Moreover, it is fixed to the foot plate 600 by screws 608, 608. As a result, it provides strong resistance to external forces acting along the x and y axes. The first elastic pads 602 are thus able to deform and absorb impacts at the time of footfall, but since the deformation is restricted to the z direction and deformation in the x and y directions is prevented, the robot can maintain a stable attitude at the time of footfall. In addition, a strong frictional force can be obtained with the ground via the second elastic pads 606.

Figure 43:
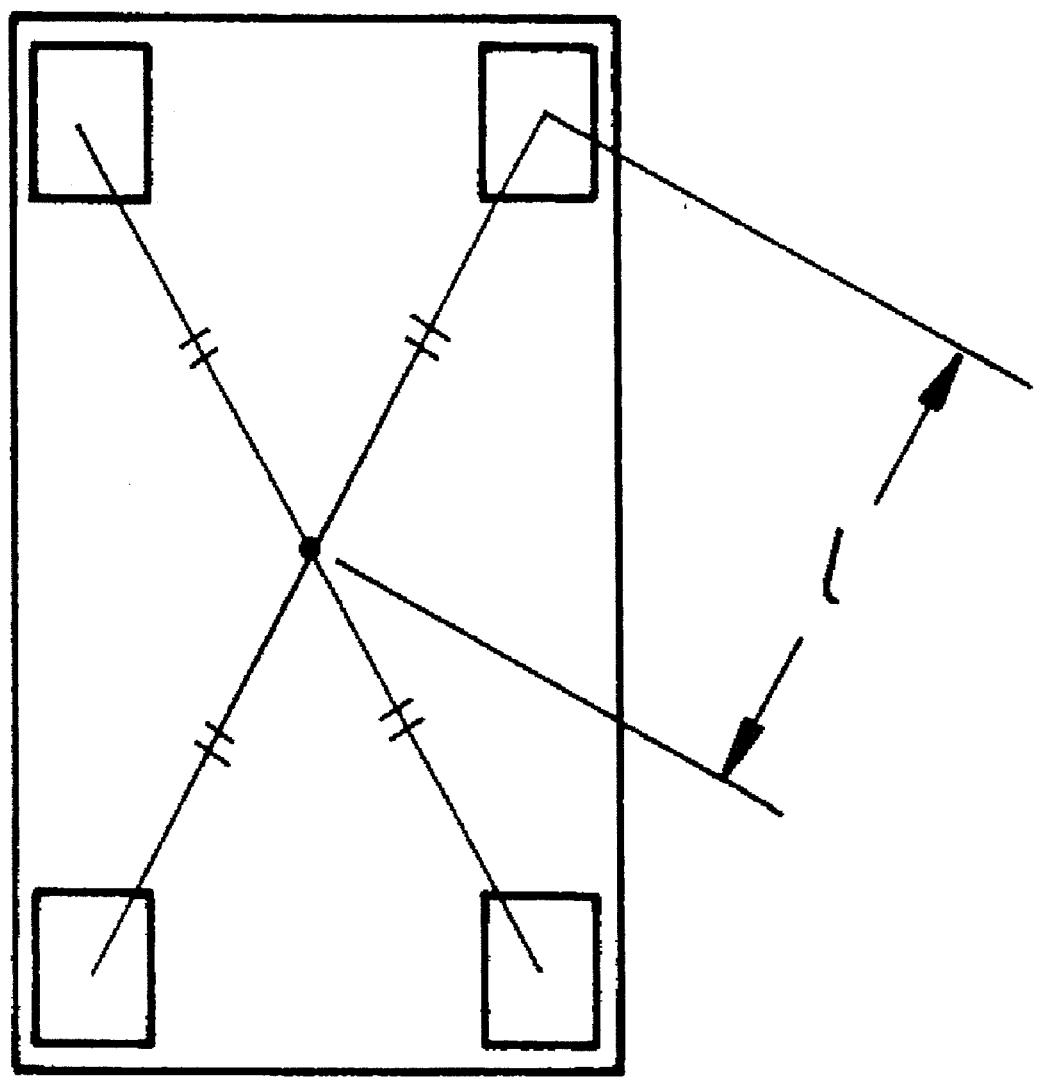
FIG. 43 is a plan view of a foot sole of the robot shown in FIGS. 41 and 42 for explaining ground contact pressure distribution for enhancing frictional force of the robot's sole.

Since as shown in the figures the first and second elastic pads are provided at the four corners of the sole, the ground contact pressure distribution can be away from the center of rotation (the point marked A in FIG. 19). As was explained earlier with reference to FIG. 43, this increases the frictional torque. Moreover, as shown in FIG. 20, the positioning of the pads at the four corners enables the sole to comply well to a certain amount of irregularity in the ground surface, thus enabling the robot to maintain a stable attitude.

Figure 21:
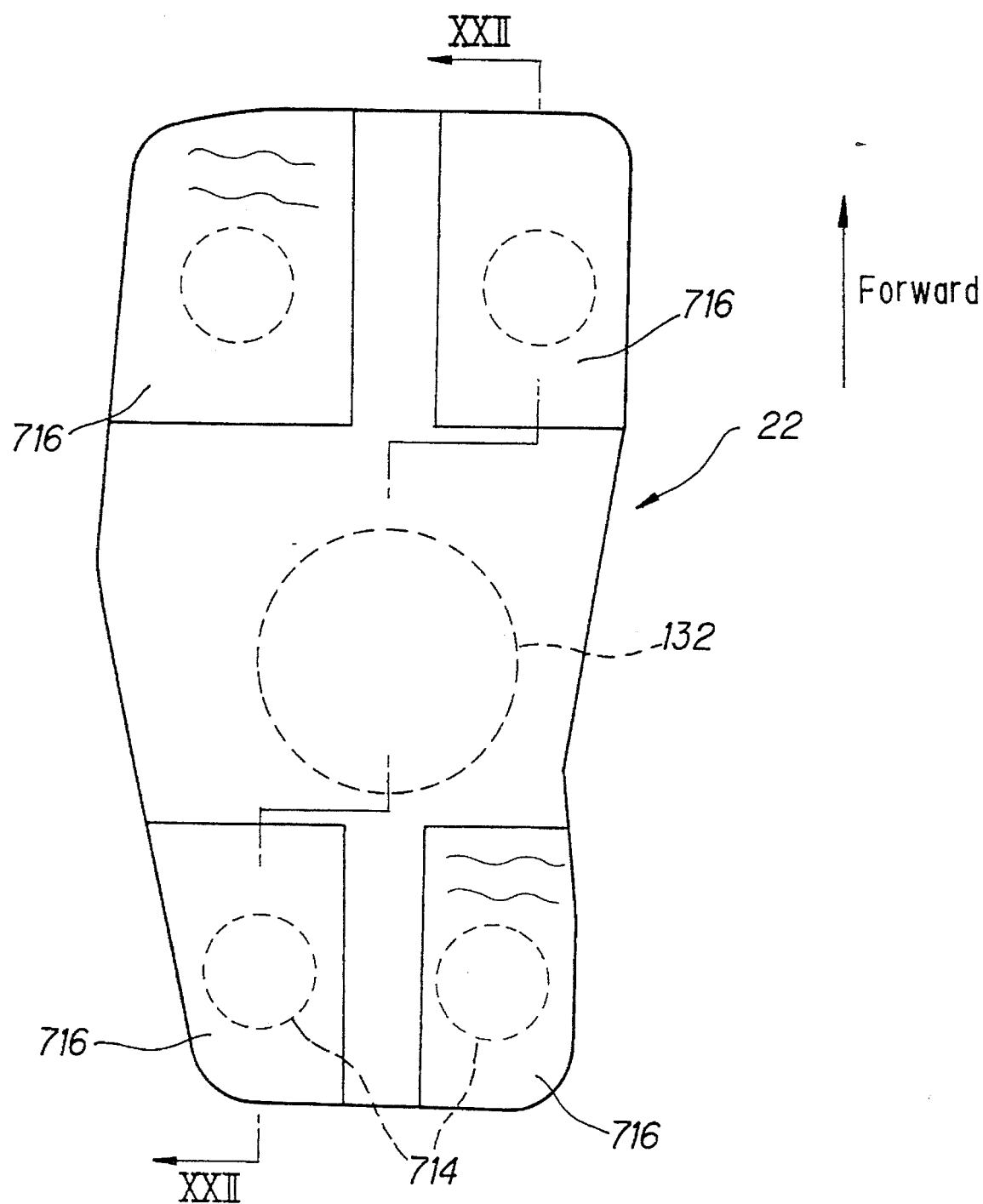
FIG. 21 is a plan view of a foot sole of the robot, similar to FIG. 19, but showing an eighth embodiment of the invention.
Figure 22:
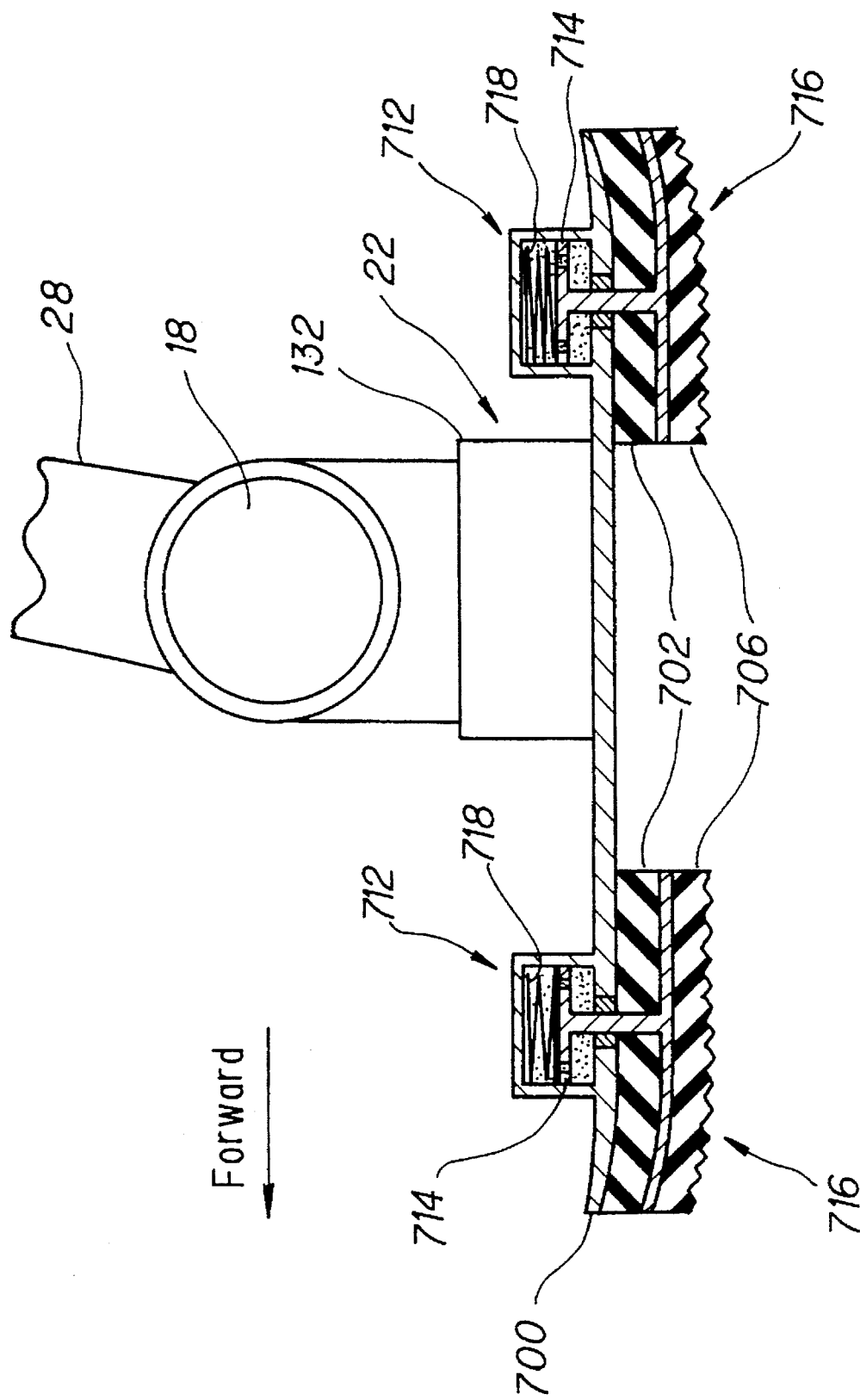
FIG. 22 is a sectional view taken along the line of XXII—XXII of FIG. 21.

FIGS. 21 and 22 show an eighth embodiment of the invention. The difference between this and the seventh embodiment is that a spring damper mechanisms are used in place of the plate spring as the means for restricting deformation of the first elastic pads to the z direction. Specifically, a foot plate 700 of the foot 22 is provided with cylindrical members 712 at four locations and four elastic members 716 equipped with pistons 714 mated with the cylindrical members 712 are disposed in vertical alignment with the cylindrical members 712. As in the seventh embodiment, the elastic members 716 in this embodiment are constituted of pads 702 made of the same material as the first elastic pads 602 and pads 706 made of the same material as the second elastic pads 606. Since springs 718 are inserted between the cylindrical members 712 and the pistons 714, the first elastic pads 702, which are the impact absorbing elements of the elastic members 716, deform only in the z direction. This ensures stable footfall while also making it possible for the second elastic pads 706 to grip the ground strongly.

Figure 23:
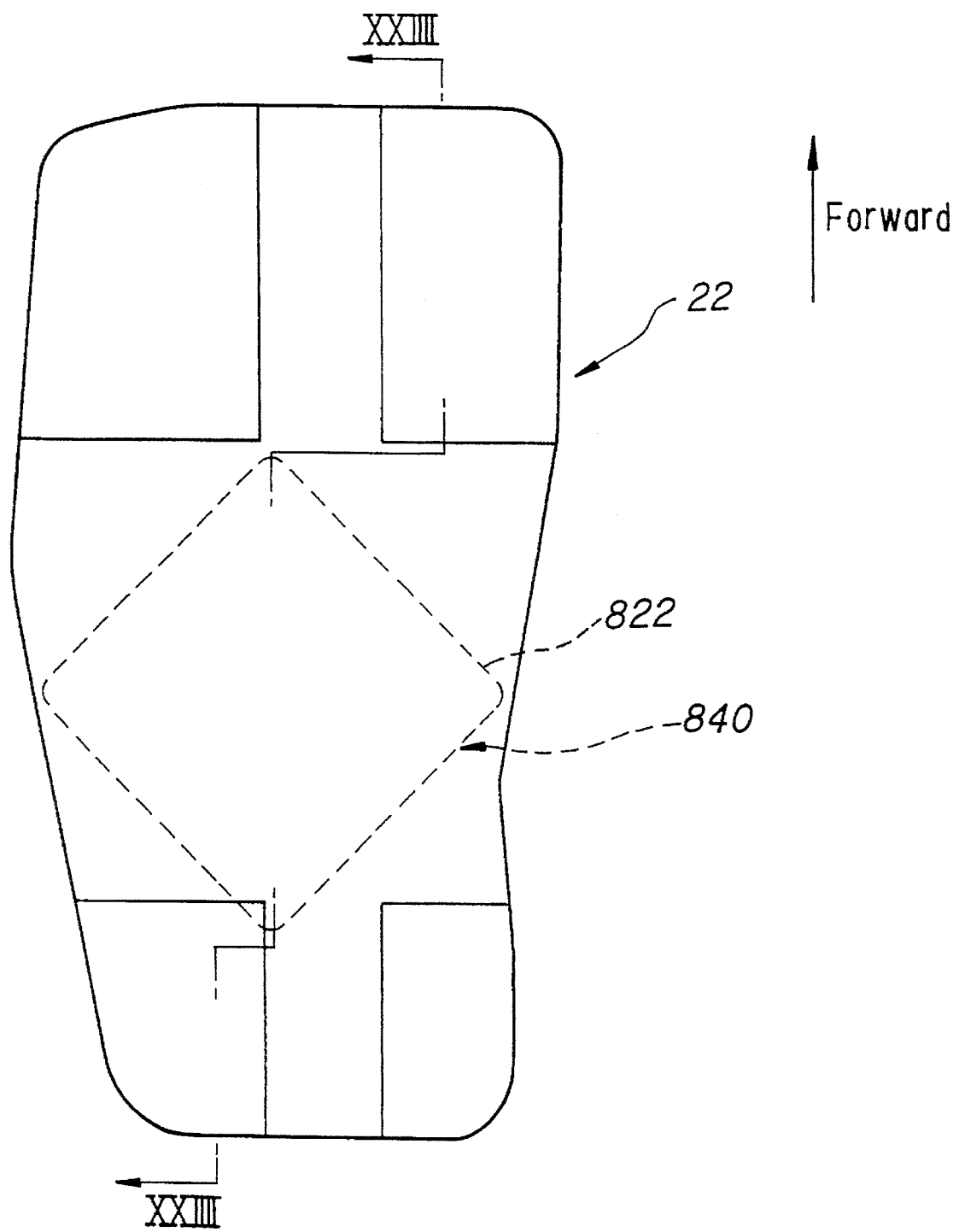
FIG. 23 is a plan view of a foot sole of the robot, similar to FIG. 19, but showing a ninth embodiment of the invention.
Figure 24:
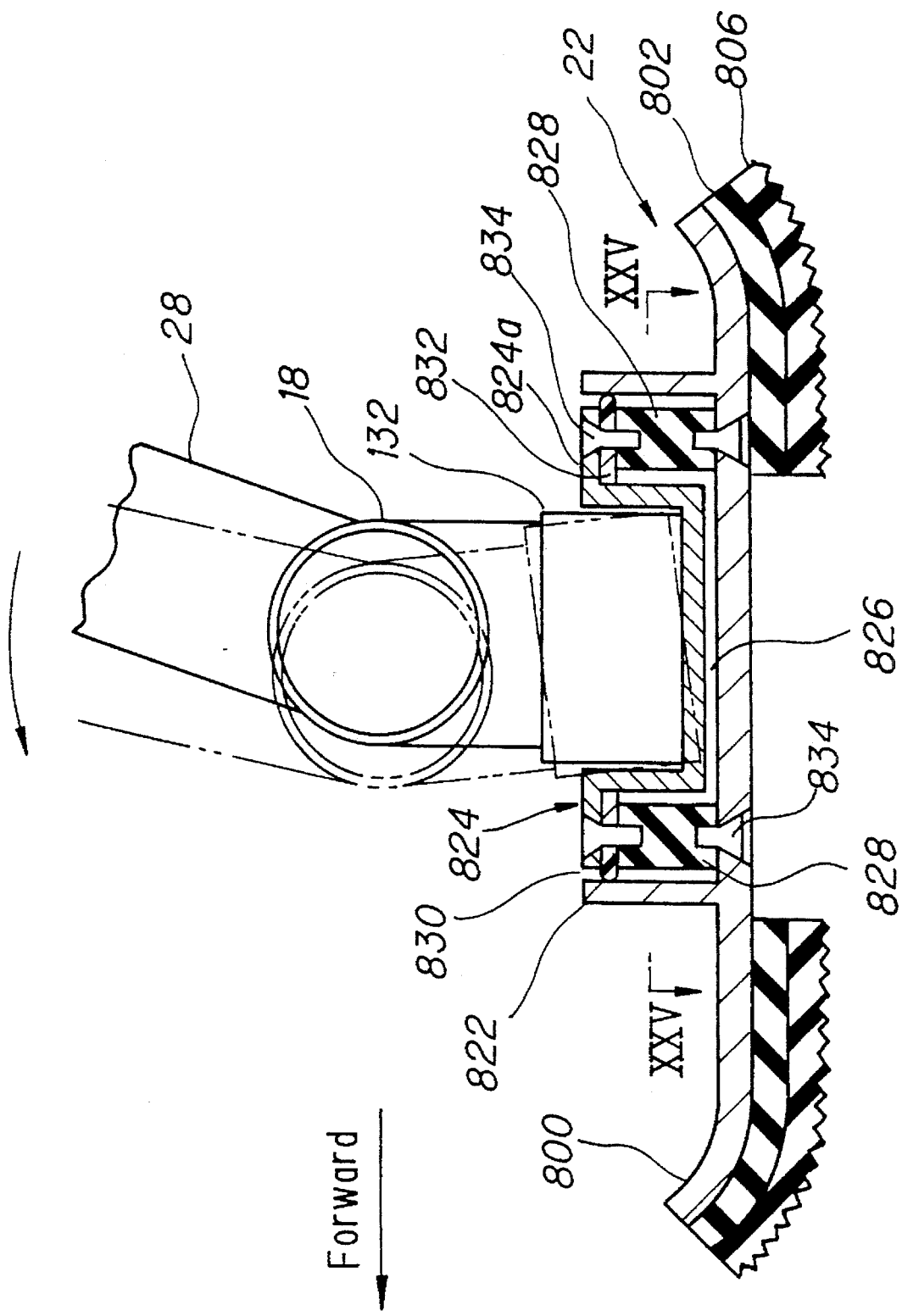
FIG. 24 is a sectional view taken along the line of XXIIII—XXIIII of FIG. 23.
Figure 25:
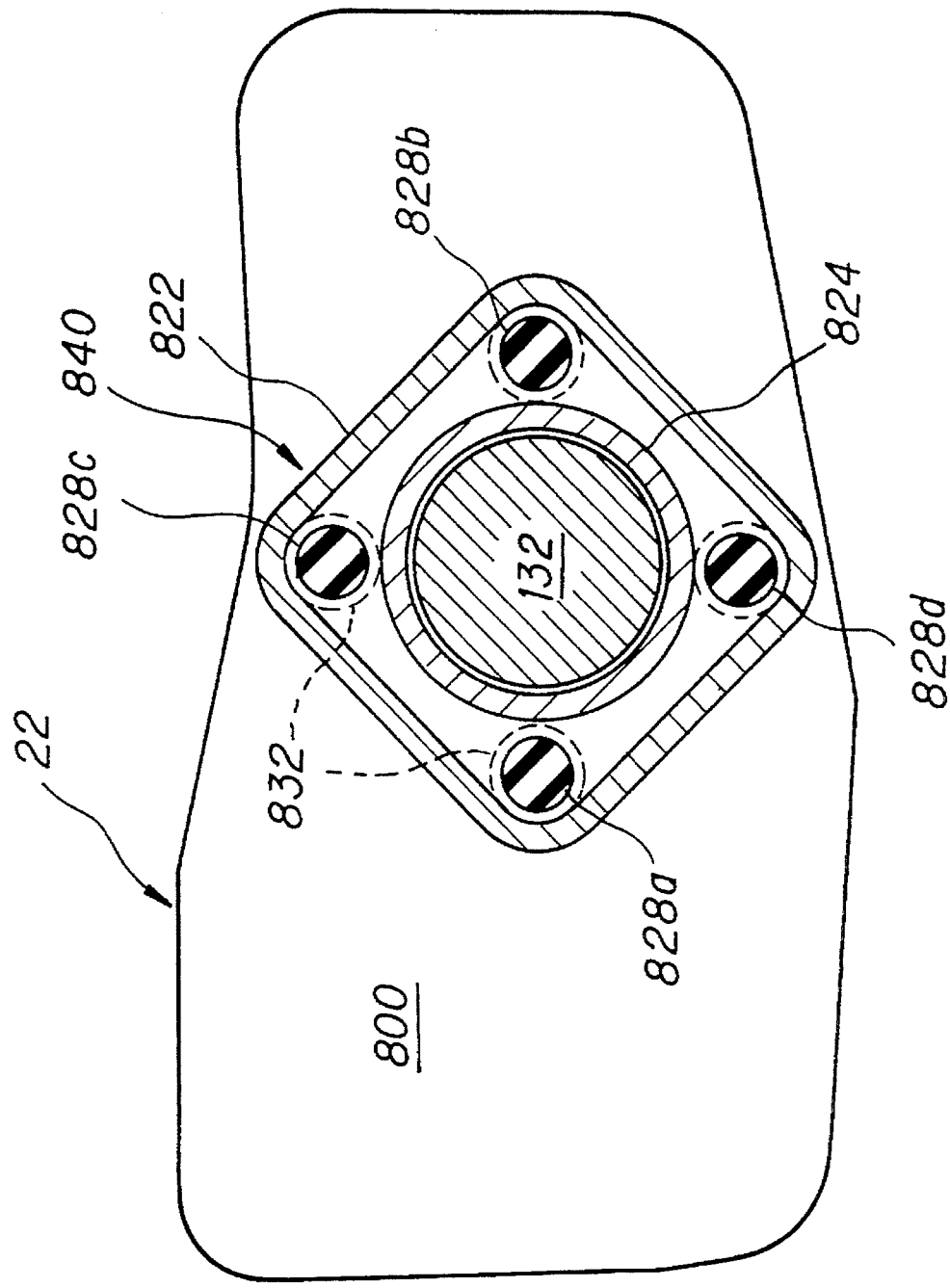
FIG. 25 is a sectional view taken along the line of XXV—XXV of FIG. 24.

FIGS. 23 to 25 show a ninth embodiment of the invention which is able to moderate turning moments produced around the x and y axis by impacts. In this embodiment a foot plate 800 has an upwardly projecting portion of substantially square shape in plan view which constitutes a cylindrical member 822. The leg link connected with the six-dimensional force and torque sensor 132 is fixed to a piston member 824 of trough-like sectional shape. The piston member 824 is accommodated in the cylindrical member such that a small gap 826 remains between itself and the foot plate 800 in the z direction. A third elastic member 828 consisting of four hard rubber bushings 828a–828d is disposed between the piston member 824 and the foot plate 800, with the bushings 828a–828d thereof spaced at 90° intervals. A second small gap 830 is left in the x and y directions between a flange 824a of the piston member 824 and the cylindrical member 822. A slide 832 constituted of plastic is provided on the bottom surface of the flange 824a so as to make sliding contact with the wall of the cylindrical member 822. The third elastic member 828 is fastened to the foot plate 800 and the slide 832 to the flange 824a by screws 834.

When the foot 22 is in contact with the ground and a moment acts about the y axis as shown in FIG. 24, the piston member 824 deforms the third elastic member 828 and tilts in the direction of the moment (forward or rearward) as shown by the phantom lines in FIG. 24, thus the mechanism illustrated hereinafter referred to as "spring mechanism" and generally designated by reference numeral 840 absorbs the moment effectively. A similar effect is also obtained when the moment acts around the x axis. Further, since the cylindrical member 822 is generally square in plan projection (see FIG. 25), moments acting about the z axis can be resisted and the spin force reduced. Further, while the bushings 828a–828d constituting the third elastic member 828 in this embodiment can all be of the same hardness, they are preferably of different harnesses in the x and y directions (i.e. in FIG. 25 the hardness of the bushings 828a, b is preferably different from that of bushings 828c, d) so as to obtain different moment resisting characteristics in the x and y directions. As in the seventh and eighth embodiments, impact moderation and ground gripping force are enhanced by bonding first and second elastic pads 802, 806, which are made of the same material as the pads 602, 606, to the bottom of the foot plate 800 at four different locations. Since the piston member 824 does not come in direct contact with the first elastic pads 802 in this embodiment, however, it is difficult to suppress moments acting on the first elastic pads around the z axis.

Figure 26:
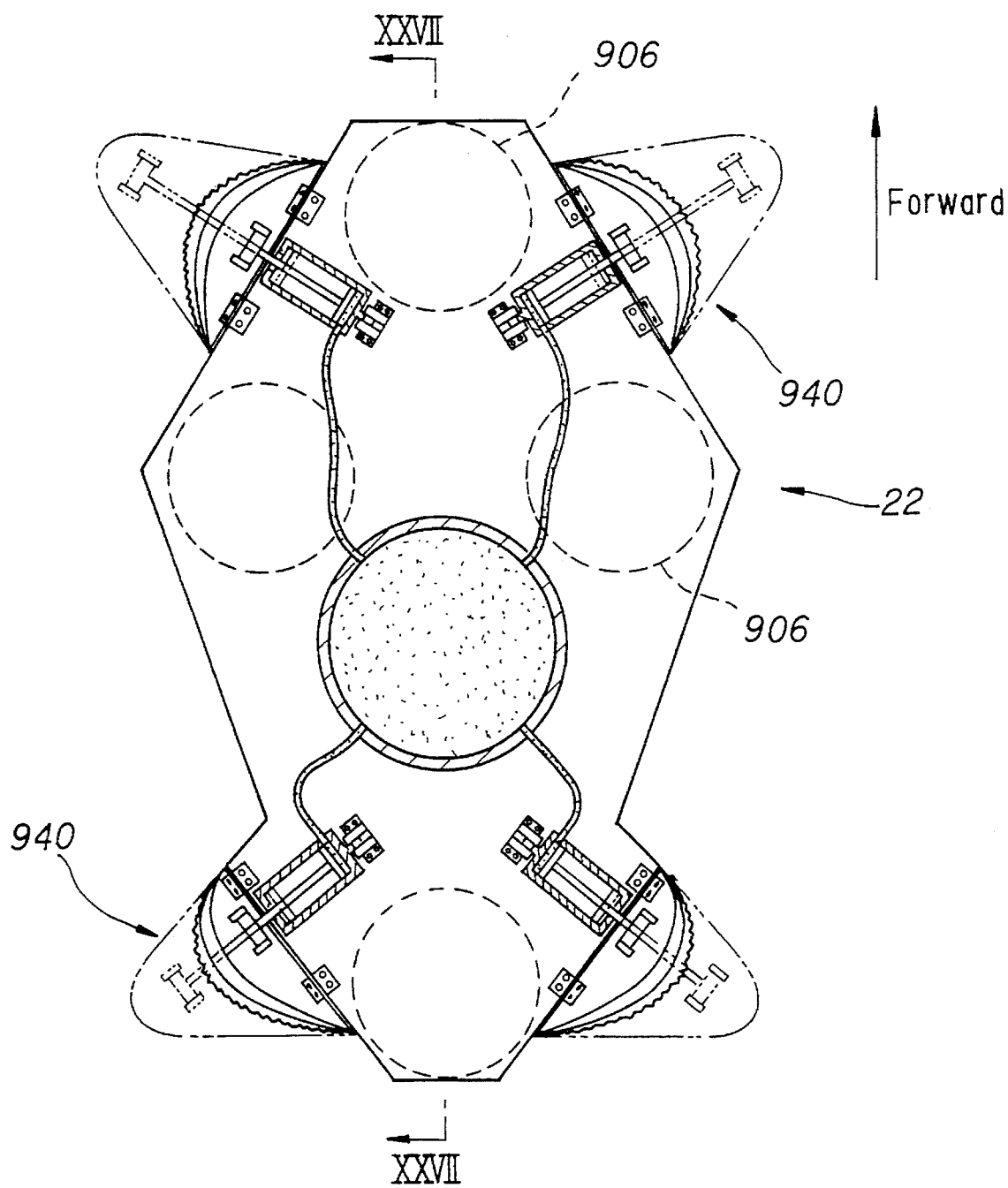
FIG. 26 is a plan, partially sectional, view of a foot sole of the robot showing an adjustment mechanism according to a tenth embodiment of the invention.
Figure 27:
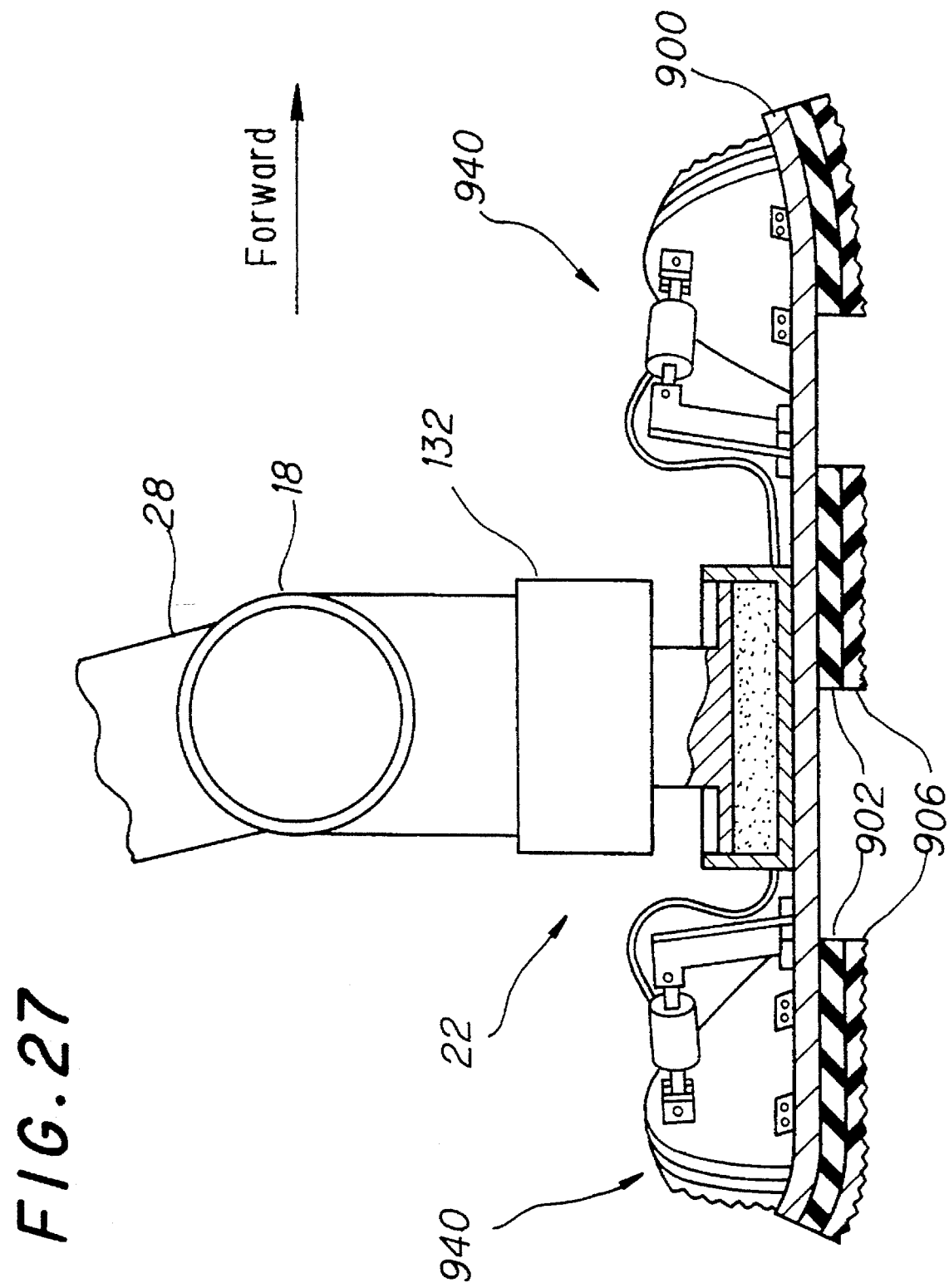
FIG. 27 is a sectional view taken along the line of XXVII—XXVII of FIG. 26.
Figure 28:
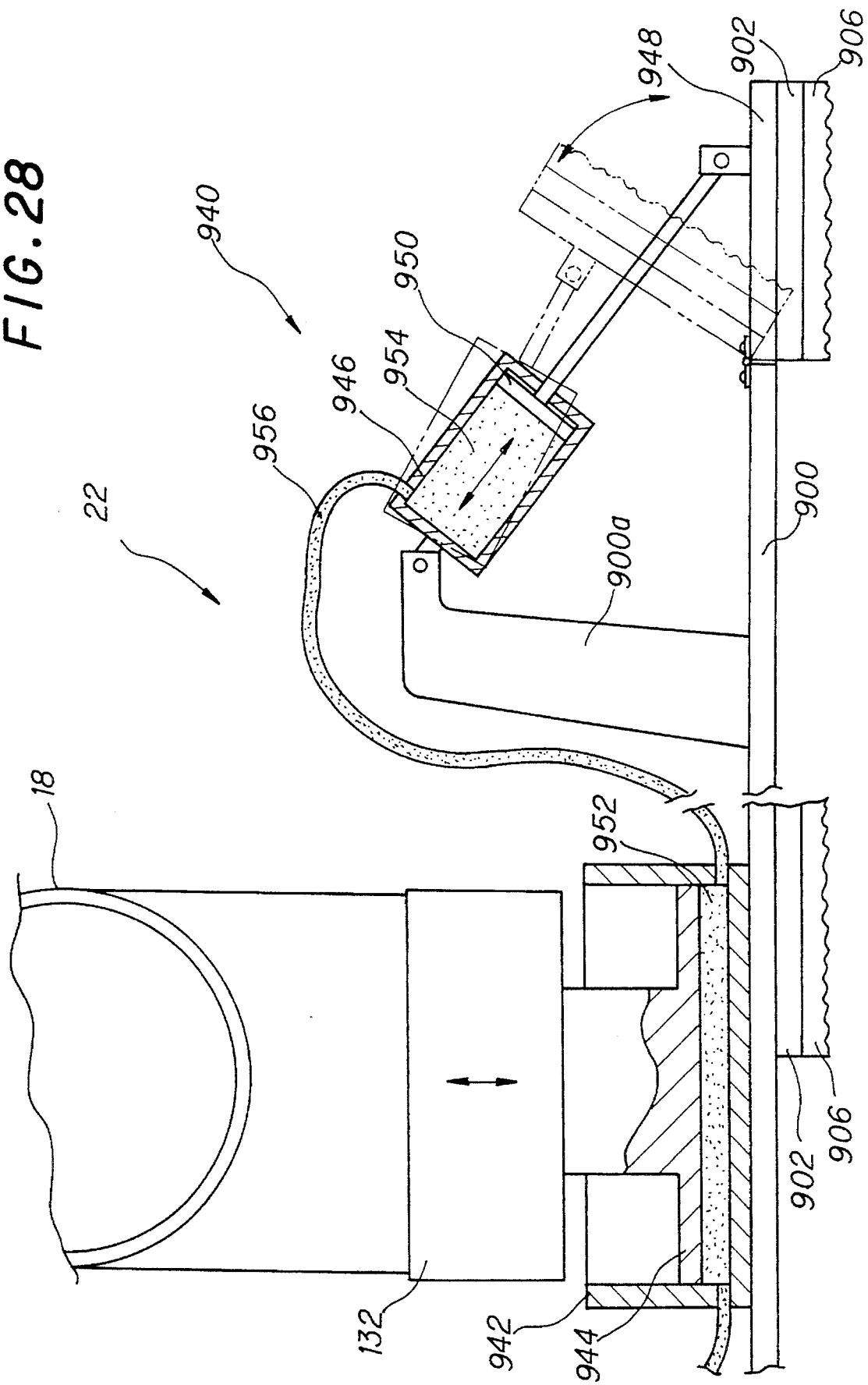
FIG. 28 is an enlarged sectional view showing the details of the adjustment mechanism illustrated in FIG. 26.

A tenth embodiment of the invention is shown in FIGS. 26 to 28. FIG. 26 shows the plan view configuration of the foot 22 according to this embodiment. As shown, the forward and rearward ends (relative to the direction of advance) of the foot 22 are tapered in plan projection. As was explained earlier, during fast walking it is the upper body that maintains the attitude of the robot in balance and all the feet have to do is thrust against the ground for propelling the robot forward. Under such circumstances, it is preferable to reduce the ground contact area. Aside from the size of the feet, it is also found that when the feet have a generally rectangular shape in plan view (as shown in FIGS. 19 to 25), it sometimes happens that, depending on the nature of the road surface, the robot's attitude may be disturbed by the corner of a foot landing first. This is why the feet in this embodiment are tapered at both ends by cropping their corners.

Another feature of the tenth embodiment is that, as shown in FIGS. 26 and 27, the narrowed portions of the foot 22 are provided with adjustment mechanisms 940 that operate under prescribed circumstances to assist in maintaining the robot's attitude. FIG. 28 is an enlarged view of one of the adjustment mechanisms 940. As in the ninth embodiment, in the region where the leg link connects with the foot 22 and a foot plate 900 has an upwardly projecting portion which constitutes a cylinder 942. A first piston 944 mated with the cylinder 942 is connected through the six-dimensional force and torque sensor 132 to the leg link. In addition, the foot plate 900 is formed at the narrowed portions thereof with four projection 900a, each of which supports a second cylinder 946 mated with a second piston 950 having a triangular (in plan view) support member 948 attached to its distal end. The support members 948 are hinged to the foot plate 900. A chamber 952 of the cylinder 942 and chambers 954 of the second cylinders 946 are filled with air or other fluid and are interconnected by tubes 956.

In the structure, when the foot of the free leg touches down, the weight of the robot presses the first piston 944 downward, causing the fluid in the chambers 952 to act on and push down the second pistons 950. As a result, the support members 948 are rotated about the hinges into contact with the ground. In this position they assist in maintaining the robot's attitude. Next, when the foot of the supporting leg lifts, the first piston 944 rises and lowers the pressure in the chamber 952. The fluid thus flows back to the chamber 952 from the second cylinders 946 and the support members 948 are retracted upward to the positions shown in FIG. 27. Owing to this configuration, the adjustment mechanisms 940 drive the support members 948 down into their operational positions only when the foot concerned supports the weight of the robot, at other times keeping them retracted. As a result, the support members 948 do not interfere with footfall and do not strike against the ground and become a cause for attitude disruption. As in the earlier embodiments, the sole of the foot is overlaid with first and second elastic pads 902, 906 dispersed locations, which are made of the same materials of the pads 602, 606.

Figure 29:
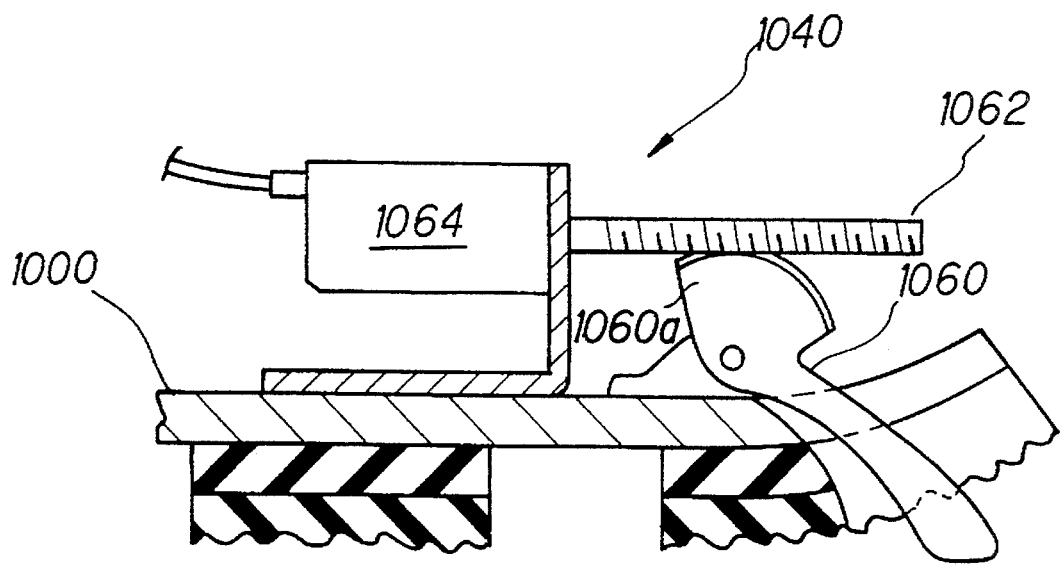
FIG. 29 is a side, partially sectional, view of a foot toe of the robot showing another adjustment mechanism according to an eleventh embodiment of the invention.

FIG. 29 shows a eleventh embodiment of the invention, which features another type of adjustment mechanism 1040. In this embodiment, a bell crank 1060 having one end expanded into a fan-shaped member 1060a is pivotal fixed on a foot plate 1000. The bell crank 1060 is formed with gear teeth which engage with a worm gear 1062 connected with the output shaft of a motor 1064. Synchronously with the walking cycle, the control unit 130 activates the motor 1064 for advancing/retracting the bell crank 1060 so as to contribute to attitude stabilization only during support periods. Similarly as the foregoing embodiments, two kinds of elastic pads are attached to the foot sole.

Figure 30:
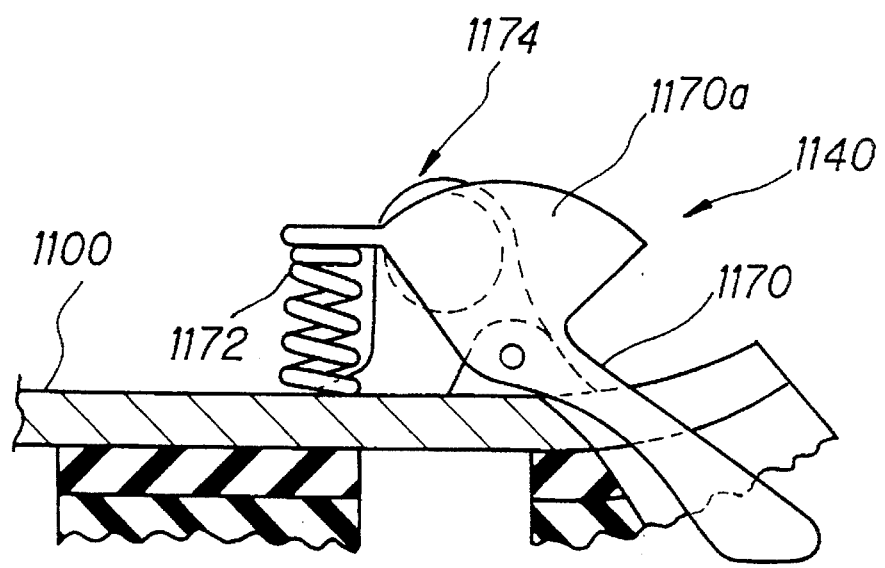
FIG. 30 is a side view, similar to FIG. 29, but showing still another adjustment mechanism according to a twelfth embodiment of the invention.

FIG. 30 shows a twelfth embodiment of the invention, which features another type of adjustment mechanism 1140. In this embodiment, a coil spring 1172 is fixed to a bell crank 1170 on a foot plate 1100 for urging it into the projected position and an appropriate control means 1172 is provided for fixing a fan-shaped member 1170a of the bell crank 1170 in the projected position.

Figure 31:
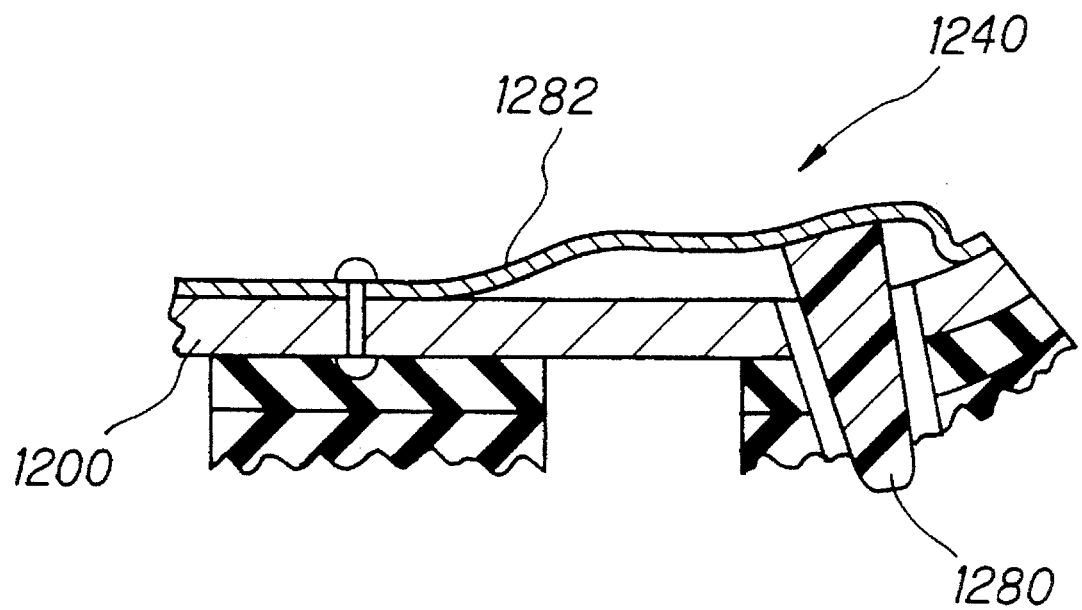
FIG. 31 is a side, partially sectional, view of a foot toe of the robot, similar to FIG. 29, but showing yet still another adjustment mechanism according to a thirteenth embodiment of the invention.

FIG. 31 shows a thirteenth embodiment of the invention in which an adjustment mechanism 1240 is constituted by attaching a protuberance 1280 made of elastic material to a foot plate 1200 through a plate spring 1282. In this embodiment, by selecting the plate spring 1282 with optimum characteristics, the adjustment mechanism 1240 can be retracted by the robots weight at the time of footrise, and by increasing the number of the adjustment mechanisms 1240, they are able to contribute to attitude stabilization during support periods.

Figure 32:
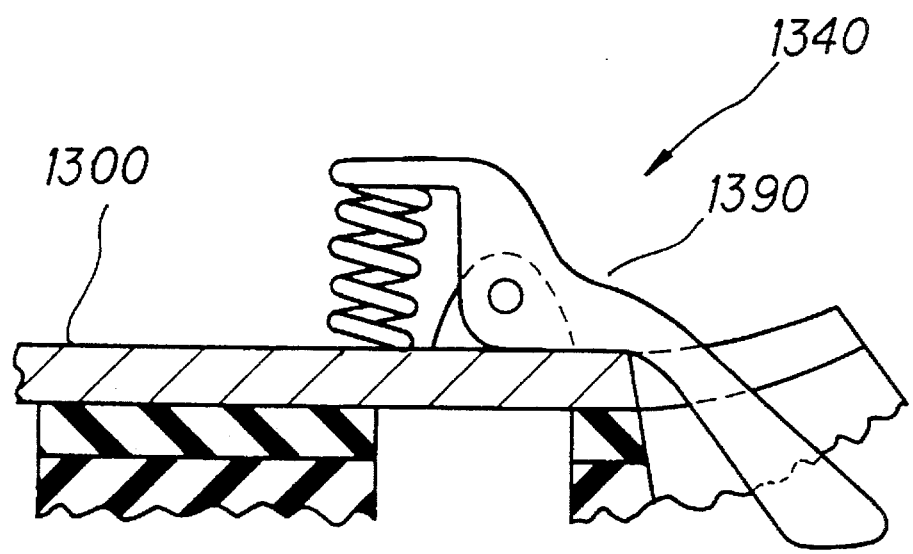
FIG. 32 is a side, partially sectional, view, similar to FIG. 29, but showing yet still another adjustment mechanism according to a fourteenth embodiment of the invention.

FIG. 32 shows a fourteenth embodiment of the invention,
in which the adjustment mechanism is constituted as a bell crank 1390, on a foot plate 1300, similar to the bell crank 1170 of the twelfth embodiment. The effect obtained is similar to that of the thirteenth embodiment. Throughout the twelfth embodiment to the fourteenth embodiment, two kinds of elastic pads are attached to the foot sole to the same purpose.

Figure 33:
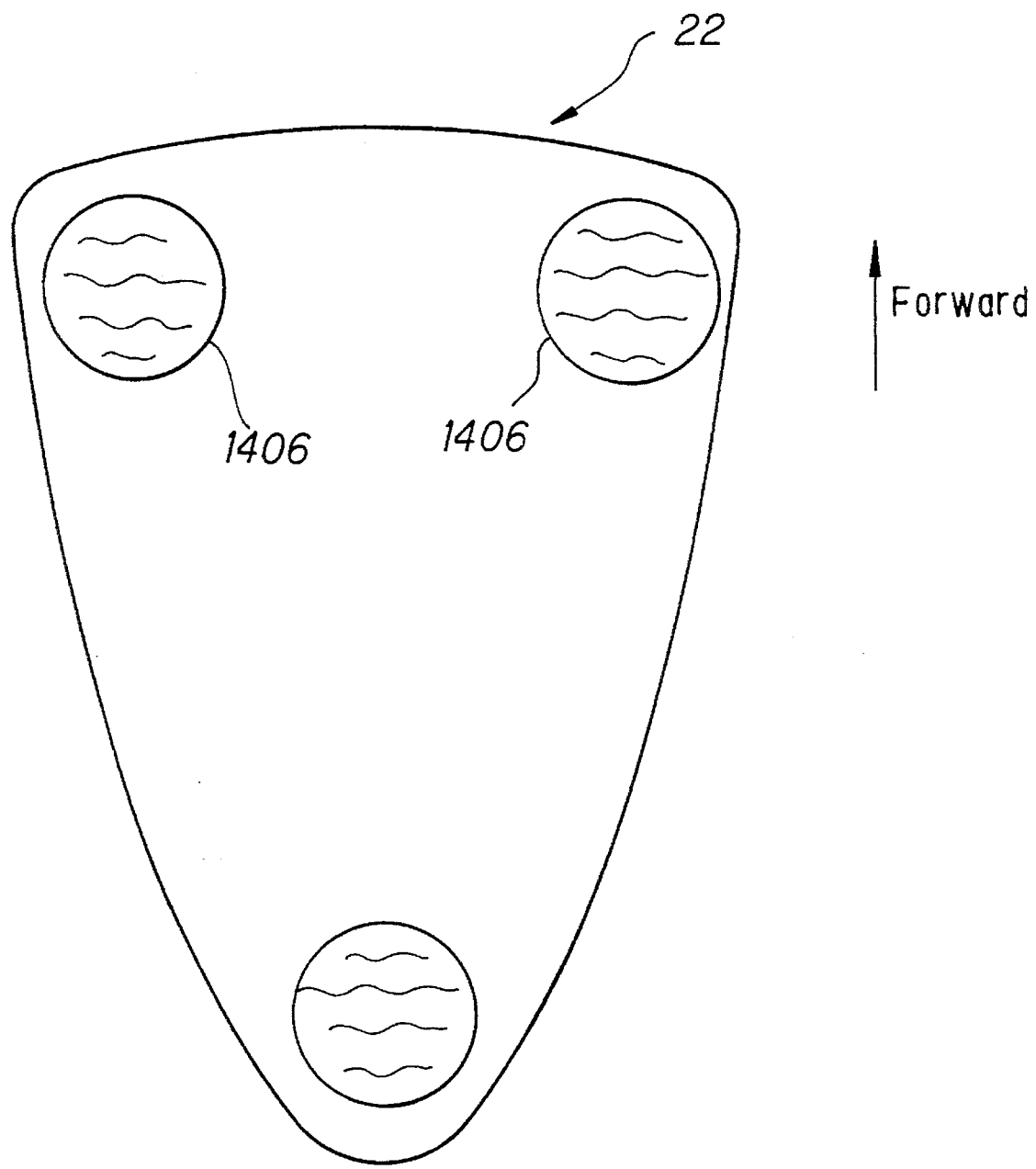
FIG. 33 is a plan view of a foot sole, similar to FIG. 19, but showing a fifteenth embodiment of the invention.

FIG. 33 shows a fifteenth embodiment of the invention, in which only the heel end of the foot 22 is tapered in plan view. Similarly to the seventh embodiment, this arrangement also reduces the ground contact area and, as such, is appropriate for fast walking. Here, reference numeral 1406 designates elastic pads having the same property as the pads 106.

Figure 34:
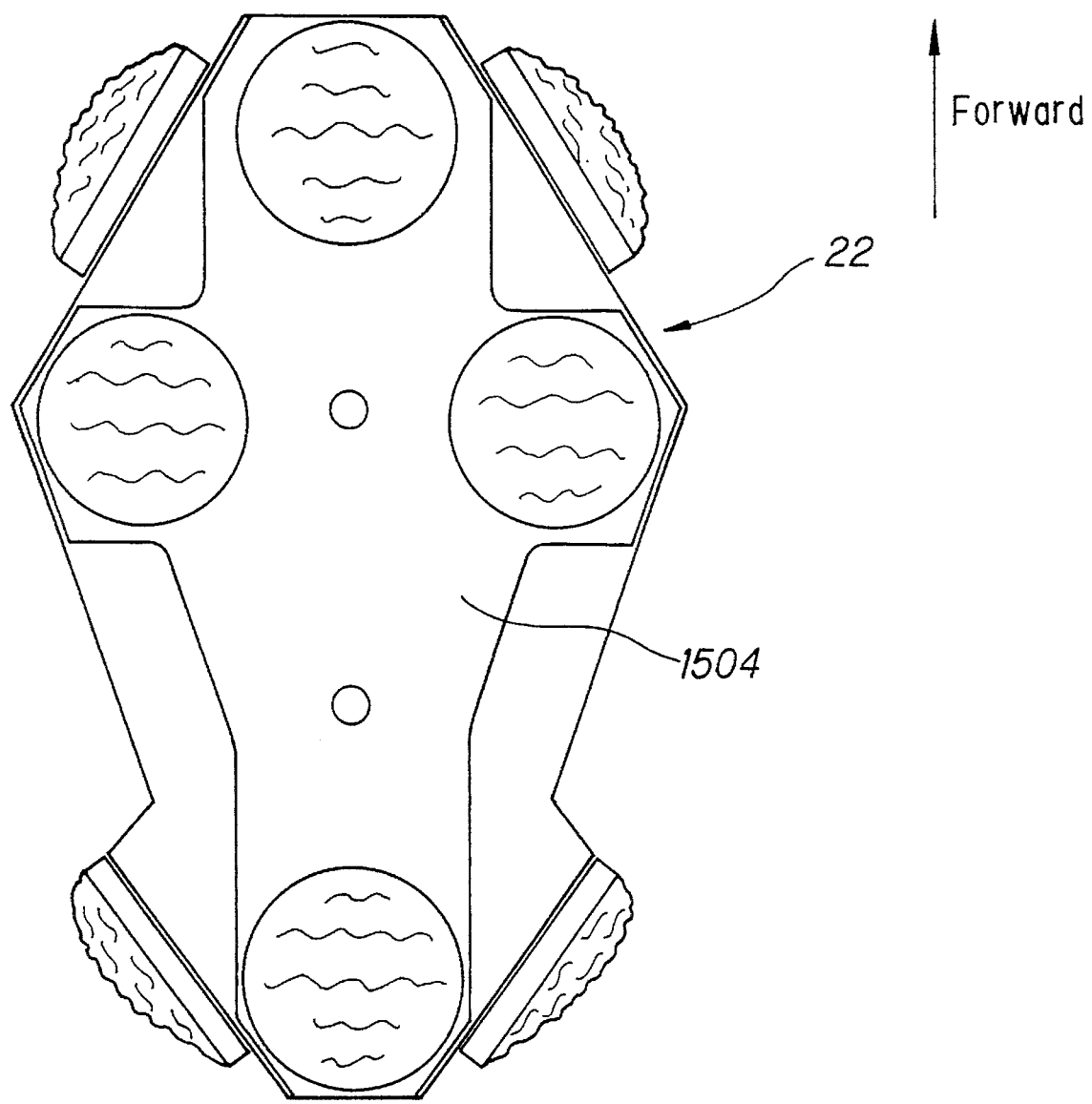
FIG. 34 is a plan view of a foot sole, similar to FIG. 19, but showing a sixteenth embodiment of the invention.

FIG. 34 shows a sixteenth embodiment of the invention, in which a plate spring 1504 like the plate spring 604 of the seventh embodiment is incorporated in a structure similar to that in the tenth embodiment of the foot 22. The combined effects of the seventh and tenth embodiments are obtained.

Similarly to the case of the sixteenth embodiment, it is also possible to realize the foot structure through various other combinations of the seventh to fifteenth embodiments.

Next, a seventeenth embodiment of the invention will be explained.

Figure 35:
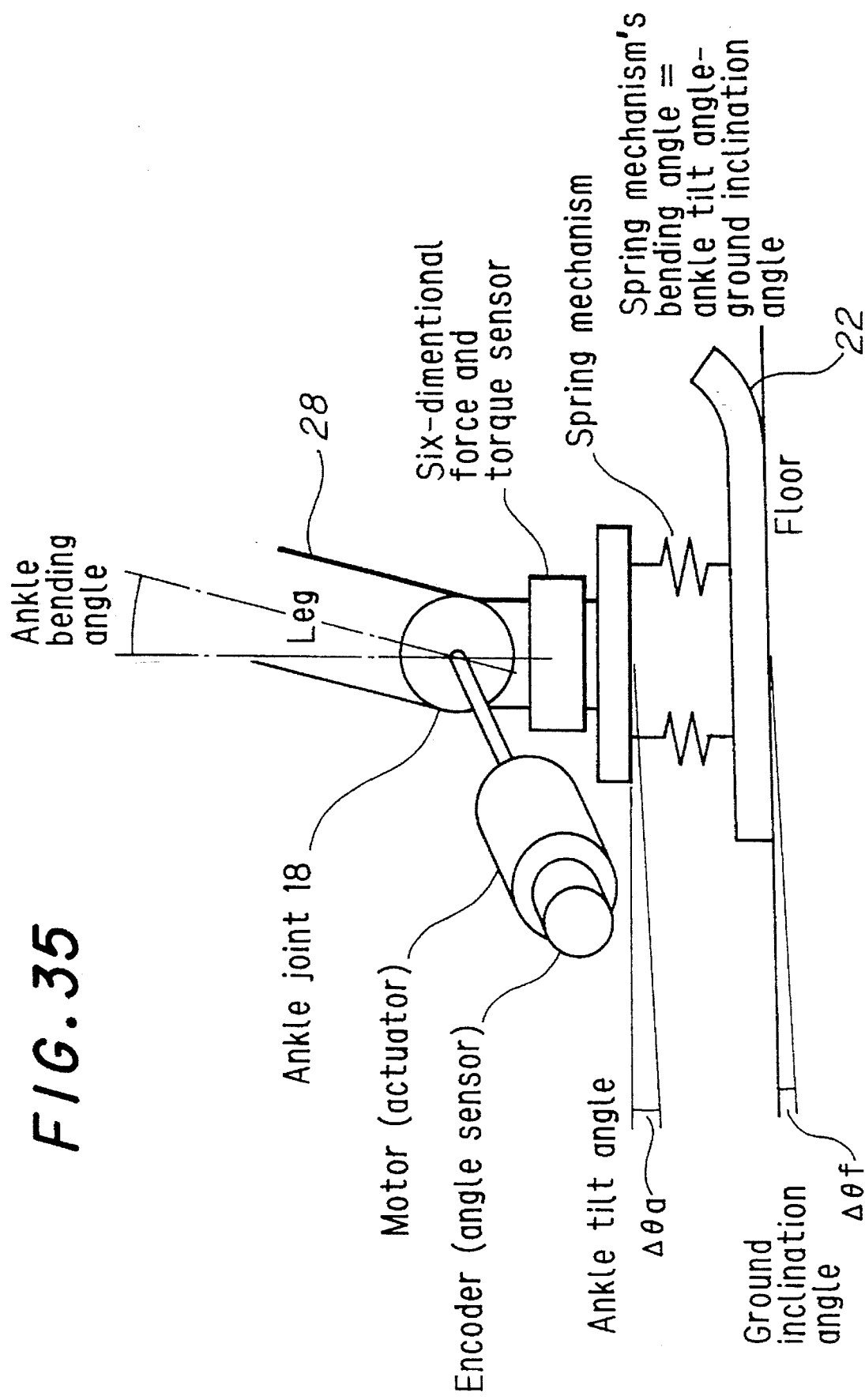
FIG. 35 is an explanatory view showing a mathematical model of the structure of the ninth embodiment of the invention illustrated in FIGS. 23 to 25 and to be used in a locomotion control system of the robot according to a seventeenth embodiment of the invention.

The seventeenth embodiment relates to a locomotion control system for a legged mobile robot having the aforesaid spring mechanism 840 mentioned in the ninth embodiment of the invention with reference to FIGS. 23 to 25, which is again illustrated in FIG. 35 as a mathematical model. Since the embodiment relates to compliance control of the ankle region, the explanation will be limited to the ankle joints 18, 20. Further, in the interest of simplicity, the explanation will be made only as to joint 18 for swinging the foot around the y axis, as illustrated. It should be understood, however, that the same control is also conducted with respect to the joint 20 for swinging the foot around the x axis.

Now, the embodiment will be explained with reference to FIG. 36. As illustrated, the rotational position of the aforesaid electric motor 98 is controlled by the servo amplifier so that the angular position of the joint 18 coincides with the angle input to the amplifier (the ankle angle command generated by the first CPU 164). In addition, a kicking force (thrust) is imparted in the form of a torque command and in the magnitude required for achieving the target ankle angle command. As shown in the figure, a first correction angle (=feedforward gain×torque command) and a second correction angle (=feedback gain×(detected ankle torque−torque command)) are added to the ankle angle command. The feedforward gain is for correcting for the amount that the spring mechanism 840 provided on the foot 22 bends owing to the application of the torque required for kicking against the ground. In other words, since the compliance imparted to the foot by the provision of the mechanism 840 tends to make the robot's ground kicking force insufficient, a correction is conducted which takes the amount of bending of the spring mechanism 840 into account. If the spring constant (torque produced by spring/spring bending angle) of the spring mechanism 840 is defined as k, the theoretical value of the feedforward gain is 1/k. Regarding the feedback, if the ankle angle command assumes flat ground and the actual ground surface inclines by an angle of delta θf, as shown in FIG. 35, a moment before correction of the ankle angle, the spring mechanism 840 produces an ankle torque (=k×delta θf, where k is the spring constant referred to above). The ankle torque produced is detected by the torque sensor (the six-dimensional force and torque sensor 132) and the product of the torque feedback gain and the difference between the detected ankle torque and the torque command is, as shown in the figure, added as a correction angle to the ankle angle command. As shown in the figure, the feedback control is negative. Upon detection of the ankle torque, therefore, the correction angle operates to escape therefrom. For example, if the ankle torque operates to cause the robot 1 to fall forward, the correction angle works to cause it to fall rearward.

Since the foot 22 is provided with the spring mechanism 840, the foot 22 is able to compliantly touch down even when the terrain includes unexpected irregularities or inclines, thus enhancing the robot's walking performance in the environment being navigated and also reducing impact at the time of footfall. Moreover, since the ankle torque predicted from the walking pattern is applied in a feedforward manner as the torque command, the ground kicking force of the robot 1 does not become insufficient. Further, since the spring mechanism 840 absorbs the high-frequency components of the torque (moment) variation, the response frequency of the control system does not have to be set very high. The stability of the torque feedback system is therefore enhanced. In addition, insofar as the amplifier gain is high enough to allow the internal friction of the motor 98 and the friction of the Harmonic drive 102 to be ignored, the transfer function from the amplifier input angle to the ankle bending angle (ankle joint angle) is substantially unity. As it is therefore possible to control the ankle torque with little influence from motor's internal friction and Harmonic drive's friction, the torque control precision is high. Furthermore, when the ground is soft, the effect in the block diagram of FIG. 36 is equivalent to reducing the spring constant of the spring mechanism 840. Therefore, if the compliancy of the ground is about the same as that of the spring mechanism 840, the effect from the viewpoint of the torque feedback control system is equivalent to reducing the spring constant of the spring mechanism moderately to one half, and, therefore, the torque feedback control system characteristics do not change extremely, which is to say that the system is relatively unaffected by ground softness.

Figure 36:
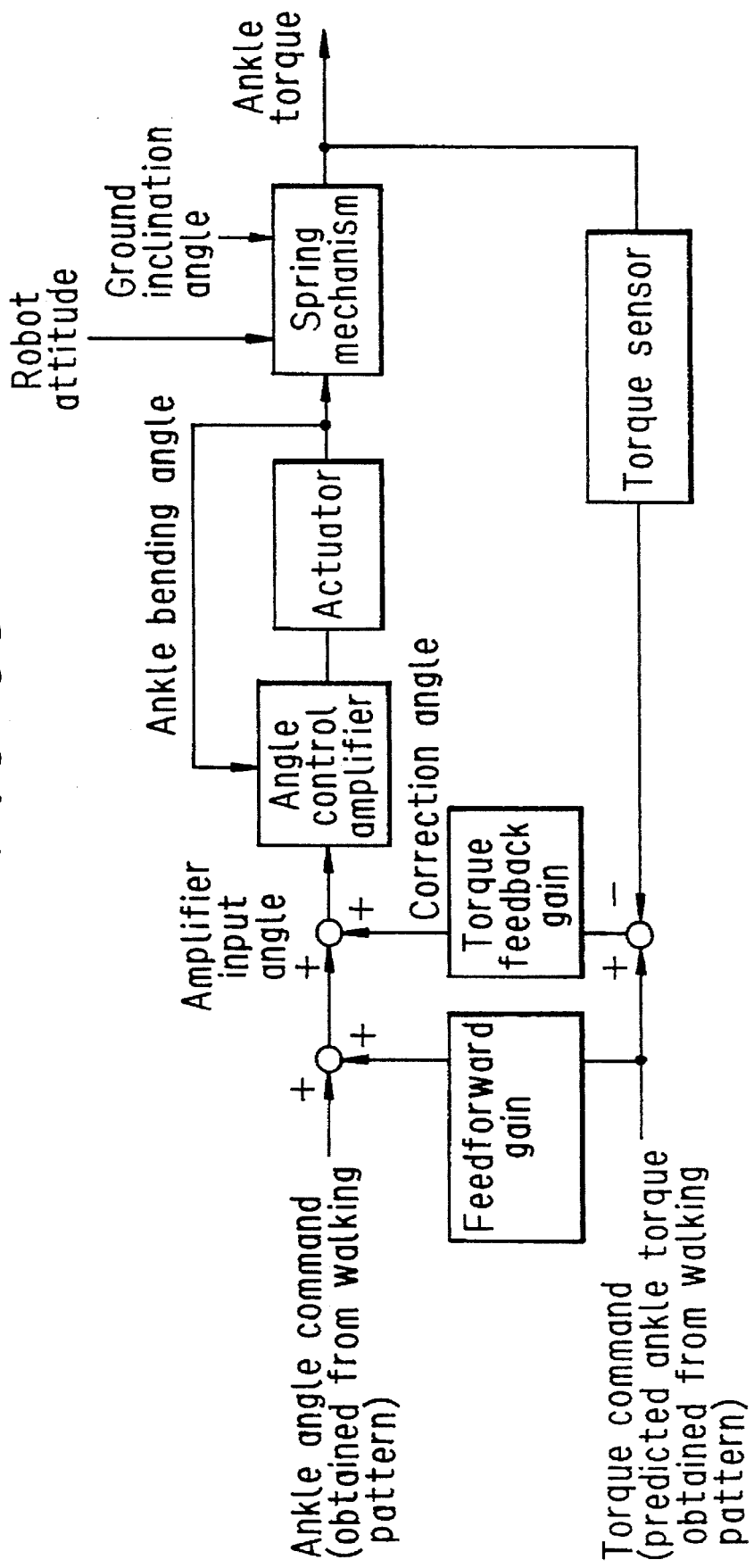
FIG. 36 is a block diagram showing the operation of the control according to the seventeenth embodiment of the invention.
Figure 37:
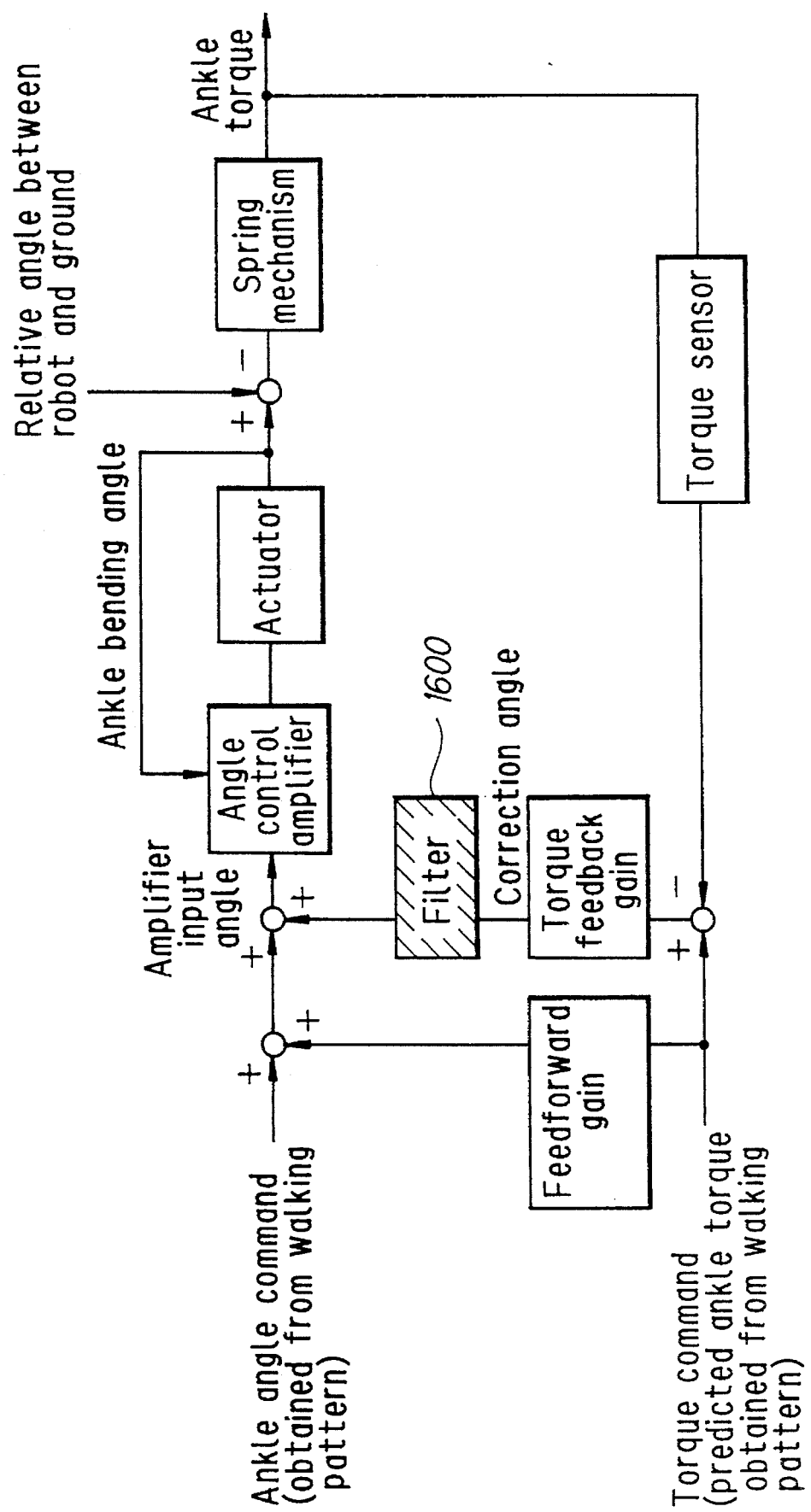
FIG. 37 is a block diagram showing another operation of the control according to an eighteenth embodiment of the invention.
Figure 38:
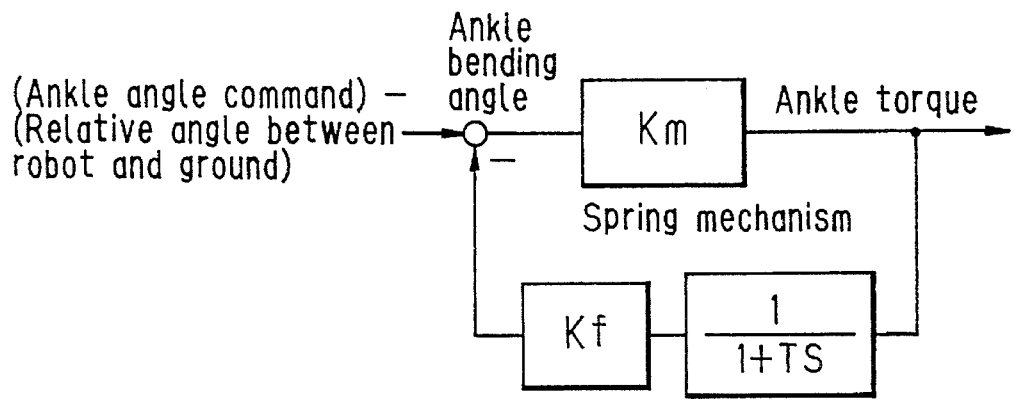
FIG. 38 is a block diagram simplified from that illustrated in FIG. 37 and focussed on a compliance control conducted in the operation.

A eighteenth embodiment of the invention is shown in FIG. 37, which is a block diagram similar to that of FIG. 36. The difference between this embodiment and the seventeenth is that the compliance control system includes a filter 1600. The filter 1600 is a low-pass filter with a transfer function of 1/(1+ TS), where T is a constant. Assuming the response of the illustrated position control system to be high and ignoring the torque command, the block diagram can be redrawn as shown in FIG. 38. In FIG. 38, the transfer function G between (ankle angle command)–(relative angle between robot and ground (delta θa–delta θf)) to the ankle torque is expressed by $$G = \frac{(TS+1)}{TS \times (KmKf+1)} Km \qquad \text{Equation 1}$$

If kmKf>>1 in Equation 1, the transfer function can be approximated by $$G = \frac{(TS+1)}{KmKf+1} Km \qquad \text{Equation 2}$$

$$= \frac{TKm}{KmKf+1} S + \frac{Km}{KmKf+1}$$

Figure 39:
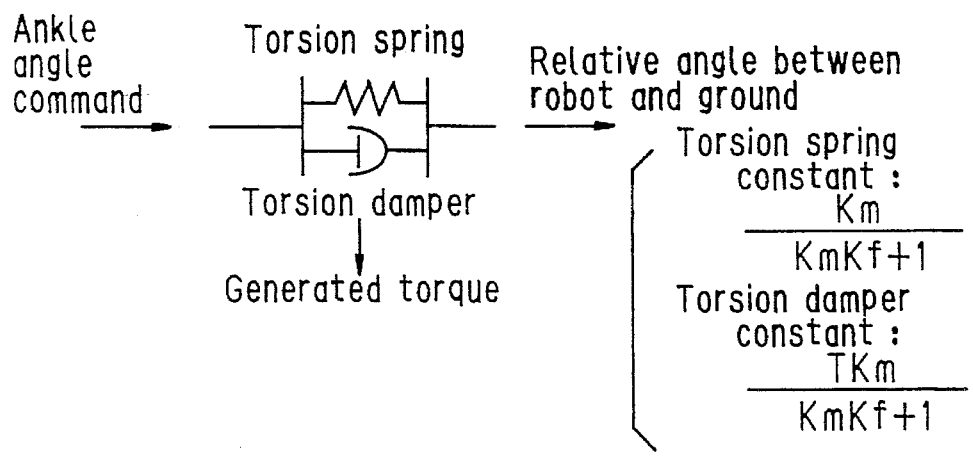
FIGS. 39 and 40 are explanatory views showing the characteristic features of the control illustrated in FIG. 38.

This is equivalent to a mechanism combining a torsion spring and a torsion damper in series, as shown in FIG. 39. In other words, by insertion of a first-order lag filter in the compliance control system it becomes possible not only to obtain the effects of the first embodiment but also to approximate the effects of an active damper. This makes it possible attenuate spring mechanism 840 vibration more rapidly.

When it is desired to form a pure spring damper system, without implementing the aforesaid approximation, the filter transfer function is defined according to Equation 3. Although not strictly a low-pass filter, it provides substantially the same function.

$$\frac{1}{1+TS} - \frac{1}{KfKm} \qquad \text{Equation 3}$$

Strictly speaking, the transfer function G in this case is $$G = \frac{T}{Kf} S + \frac{1}{Kf} \qquad \text{Equation 4}$$

Figure 40:
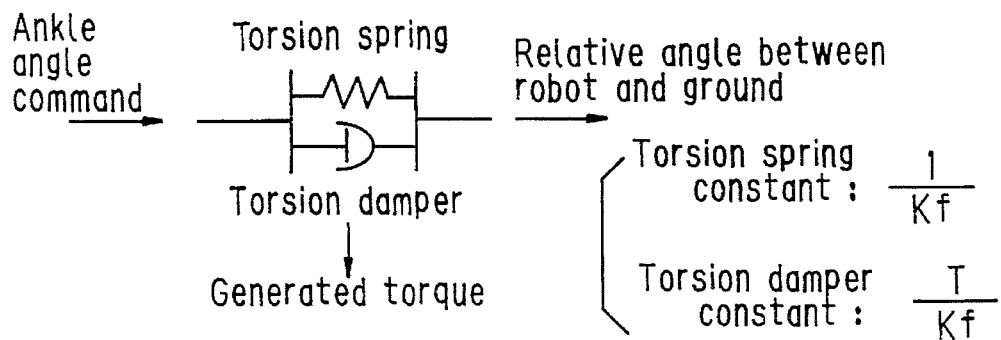
Figure 41:
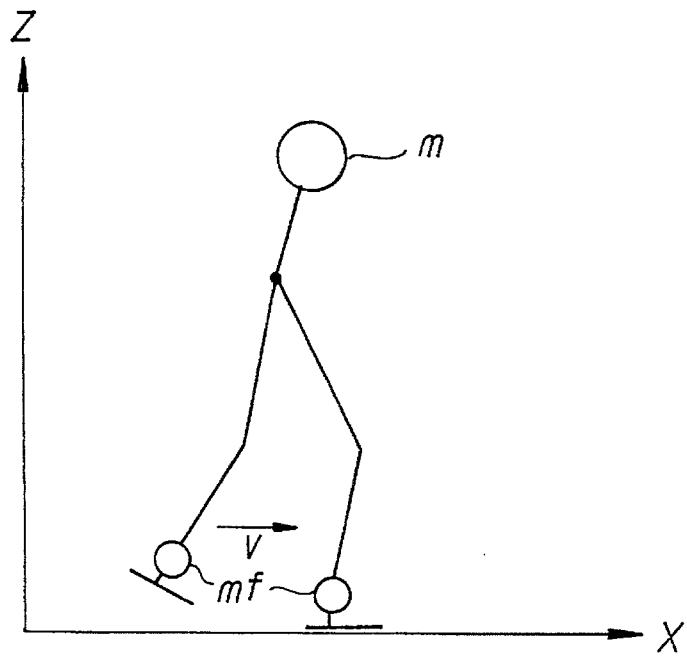
FIG. 41 is a view showing a biped robot viewed in the direction perpendicular to the robot's advancing direction for explaining spin force acting on the robot.
Figure 42:
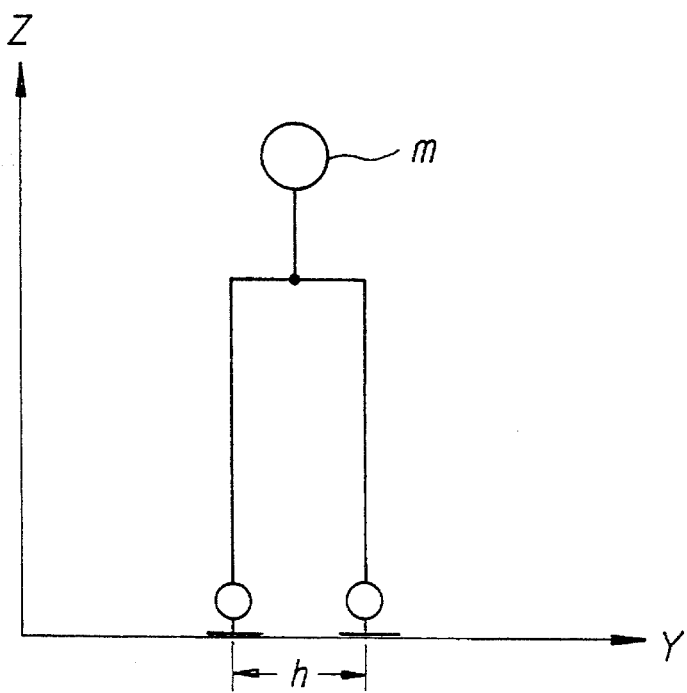
FIG. 42 is a view, similar to FIG. 41, but showing the robot viewed in the advancing direction for explaining the spin force.

This is equivalent to the mechanism shown in FIG. 40.

Owing to the aforesaid configuration, in compliance control using a load sensor (the six-dimensional force and torque sensor 132), the eighteenth embodiment is, by use of a filter, able to achieve a damping effect equivalent to that of inserting a mechanical damper between the robot and the ground. As a result, it is able to facilitate control of an inverted pendulum system and to prevent jumping caused by the reaction at the time of free leg footfall. Moreover, since the high-frequency loop gain is reduced as a secondary effect of including the low-pass filter in the feedback loop, the stability of the compliance control system is enhanced and oscillation is prevented. It also becomes possible to eliminate high-frequency noise intruding through the sensor.

Although the filter of the eighteenth embodiment is a digital filter, it is also possible to use an electric filter, a mechanical filter or other such hardware means. Moreover, instead of a low-pass filter whose transfer characteristics exhibit first-order lag, it is possible to use any of various other types including one exhibiting second-order lag.

While it was explained that the load is detected from the torque (moment), it is alternatively possible to detect it as a force. Nor is it necessary for the six-dimensional force and torque sensor to be positioned above the spring mechanism. It can be disposed below instead.

While the invention was described with reference to a biped walking robot as an example of a legged walking robot, the invention can also be applied to legged robots other than the biped one.

Moreover, the present invention has thus been shown and described with reference to the specific embodiments. However, it should be noted that the present invention is in no way limited to the details of the described arrangements, changes and modifications may be made without departing from the scope of the appended claims.

What is claimed is:

1. In a legged mobile robot of the type having a body and a plurality of legs each connected to the body the improvement comprising:

an impact absorption mechanism between the body and legs oriented to allow the body and the individual legs to be displaceable with respect to each other in the gravitational direction, for absorbing external forces acting on the body or the individual legs, the impact absorption mechanism comprising:

an elastic member interposed between a portion of the body and a portion of each leg;

a fastener extending through the elastic member and connecting the portion of the body and the portion of each leg; and a shaft encircling the fastener to limit movement of the fastener to vertical movement.

2. A robot according to claim 1, wherein the impact absorption mechanism further includes a spring interposed between the portion of the body and the portion of each leg.

3. In a legged mobile robot having a plurality of articulated legs each having a joint connecting a first link to a second link, the improvement comprising:

an impact absorption mechanism at the joint and including an elastic member, for absorbing external forces acting between the first link and the second link with the joint including:

a motor mounted on the first link;

a drive having an input connected to an output shaft of the motor and an output connected to the second link wherein the impact absorption mechanism further comprises:

a pin interposed between the output of the drive and the second link;

a member having a hole for receiving the pin; and the elastic member positioned in the hole and contacting at least one side of the pin.

4. A robot according to claim 3, wherein the leg links are made displaceable with respect to each other about an axis of the joint.

5. A robot according to claim 3, wherein the hole is an oblong hole.

6. A robot according to claim 5, wherein the pin is sandwiched between the elastic member.

7. A robot according to claim 5, wherein the elastic member contacts the pin on two opposite sides.

8. A robot according to claim 5, wherein the elastic member is pre-compressed in the oblong hole.

9. A robot according to claim 5, wherein the hole is a square hole.

10. A robot according to claim 9, wherein the elastic member is a spring.

11. A robot according to claim 9, wherein the pin is square.

12. A robot according to claim 3, wherein the robot is a biped robot and the joint connecting the first and second leg links is a knee joint.

13. In a legged mobile robot of the type having a plurality of legs each having a foot, the improvement comprising:

an impact absorption mechanism on the foot comprising:

a cylinder mounted on a sole of the foot and forming a chamber;

a piston slidably movable in the cylinder;

fluid in the chamber;

a piston rod having a ground contact member, the piston rod movable into the cylinder against the resistance of the fluid to absorb impact acting on the robot when the foot lands on the ground; and means for restricting the direction in which the piston moves.

14. In a legged mobile robot of the type having a plurality of legs with each leg having a foot, the improvement comprising:

an impact absorption mechanism connecting each leg and foot, and including an elastic member to allow the leg and the foot to be displaceable with respect to each other in response to a moment or force to absorb impact acting when the foot lands on the ground, the impact absorption mechanism comprising an outer member mounted on the foot; an inner member within the outer member and connected to a distal end of each leg; and the elastic member placed between the outer member and the inner member.

15. A robot according to claim 14, wherein the inner member has a trough-like shape and a flanged end resting on the elastic member.

16. A robot according to claim 15, wherein the inner member is suspended over the foot.

17. A robot according to claim 15, wherein the flanged end of the inner member includes an elastic slide in contact with an inner wall of the outer member.

18. A robot according to claim 14, wherein the elastic comprises a plurality of spaced apart elastic bushings.

19. A robot according to claim 18, wherein the elastic member comprises four elastic bushings radially spaced apart at 90° intervals, and wherein an axis passing through opposite bushings coincides with the direction in which the robot advances and the direction perpendicular thereto.

20. A robot according to claim 19, wherein the bushings all have the same hardness.

21. A robot according to claim 19, wherein the bushings have different hardness.

22. A robot according to claim 14, wherein the foot has a sole with a third elastic member.

23. A robot according to claim 22, wherein the third elastic member is placed at a corner of the sole of the foot.

24. In a legged mobile robot of the type having a plurality of legs with each leg having a foot, the improvement comprising:

an elastic member attached to a sole of the foot for absorbing impact generated when the foot portion lands on the ground; and a plate spring between and separating the sole and the elastic member, and underlying substantially the entire sole for restricting the deformation of the elastic member with the plate spring rigidly attached to the sole.

25. A robot according to claim 24 further comprising a second elastic member attached to the bottom of the plate spring for contacting the ground, the second elastic member spaced away from the center of the foot for resisting spin force acting on a leg which supports the robot weight when other leg free from the robot weight is swung.

26. A robot according to claim 25, wherein the second elastic member is positioned at a corner of the sole.

27. In a legged mobile robot of the type having a plurality of legs with each leg having a foot, the improvement comprising:

an elastic member attached to a sole of the foot for absorbing impact; and a spring dampener mechanism positioned between the sole and the elastic member for restricting deformation of the elastic member, the spring dampener mechanism comprising:

a cylinder mounted on the foot portion and forming a chamber;

a piston slidably movable in the cylinder;

a fluid in the chamber;

a spring disposed in the chamber to urge the piston out of the cylinder; and a piston rod having a distal end connected to the elastic member.

28. In a legged robot of the type having a plurality of legs, with each leg having a foot, the improvement comprising:

a foot having a first section narrower than a second section of the foot; and means for widening the first section, including at least one flap section pivotally attached to the foot.

29. A robot according to claim 28, wherein the means for widening further comprises:

a cylinder mounted on the foot and forming a chamber;

a piston slidably movable in the cylinder and having a rod connected to the flap section;

a fluid in the chamber; and means for pumping the fluid into the cylinder to displace the flap section.

30. A robot according to claim 28, wherein the means for widening comprises:

a projection positioned at the end of the narrow region; and means for projecting the projection when the foot portion lands on the ground.

31. A robot according to claim 30, wherein the means is a motor.

32. A robot according to claim 30, wherein the means is a spring.

33. A robot according to claim 28, wherein the first section comprises the heel area of the foot.

34. A robot according to claim 30, further comprising an elastic member at the periphery of the sole for resisting spin force acting on a leg which supports the robot weight when other leg free from the robot weight is swung.

35. A robot according to claim 34, wherein the elastic member is positioned at a corner of the sole.

36. A robot according to claim 28, wherein the first section comprises the toe area of the foot.

37. A robot according to claim 36, further comprising an elastic member at the periphery of the sole for resisting spin force acting on a leg which supports the robot weight when other leg free from the robot weight is swung.

38. A robot according to claim 37, wherein the elastic member is placed at a corner of the sole.

39. A robot according to claim 36, further including:

an elastic member attached to a sole of the foot portion for absorbing impact generated when the foot portion lands on the ground; and means for restricting the deformation of the elastic member in the direction vertical to the sole.

40. A robot according to claim 39, wherein said means is a plate spring sandwiched between the sole and the elastic member.

41. A system for controlling locomotion of a legged mobile robot having a plurality of articulated legs each having a foot portion at its distal end and at least one joint adjacent thereto; comprising:

an impact absorption mechanism including an elastic member for connecting the distal end of each leg and the foot portion and allowing the leg and the foot portion to be displaceable with respect to each other;

servo motor means provided at the joint;

first means for providing a control value to the servo motor means for driving the joint to a target angle;

second means for detecting moment or force acting on the legs; and control means for correcting the control value in response to the detected moment or force to impart compliance to the leg.

42. A system according to claim 41, wherein said control means corrects the control value in response to a low frequency component of the detected moment or force.

* * * * *